Inventors
Burton G. McConchie
Frank Pulsifer
By their Attorney
Thomas J. Ryan

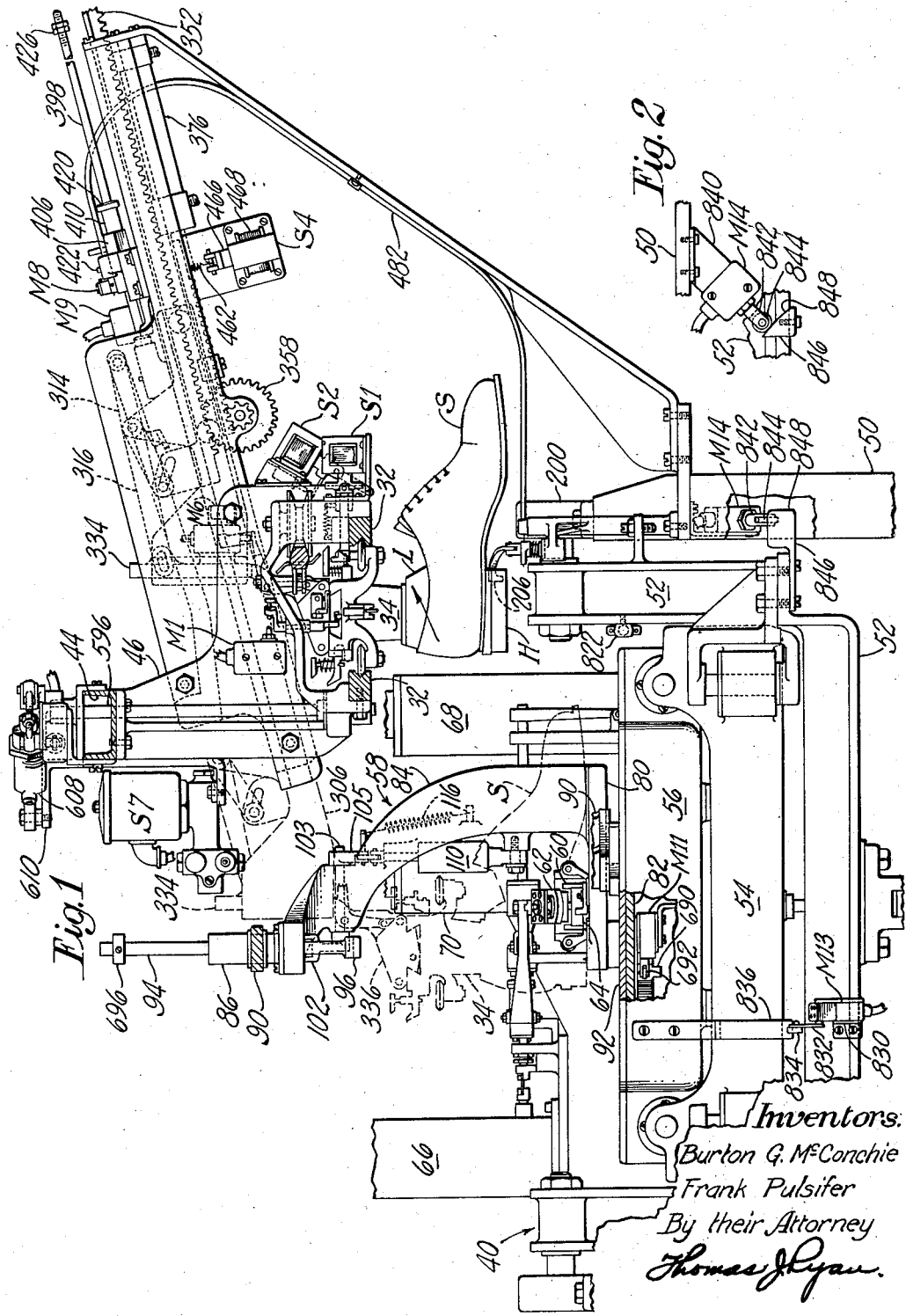

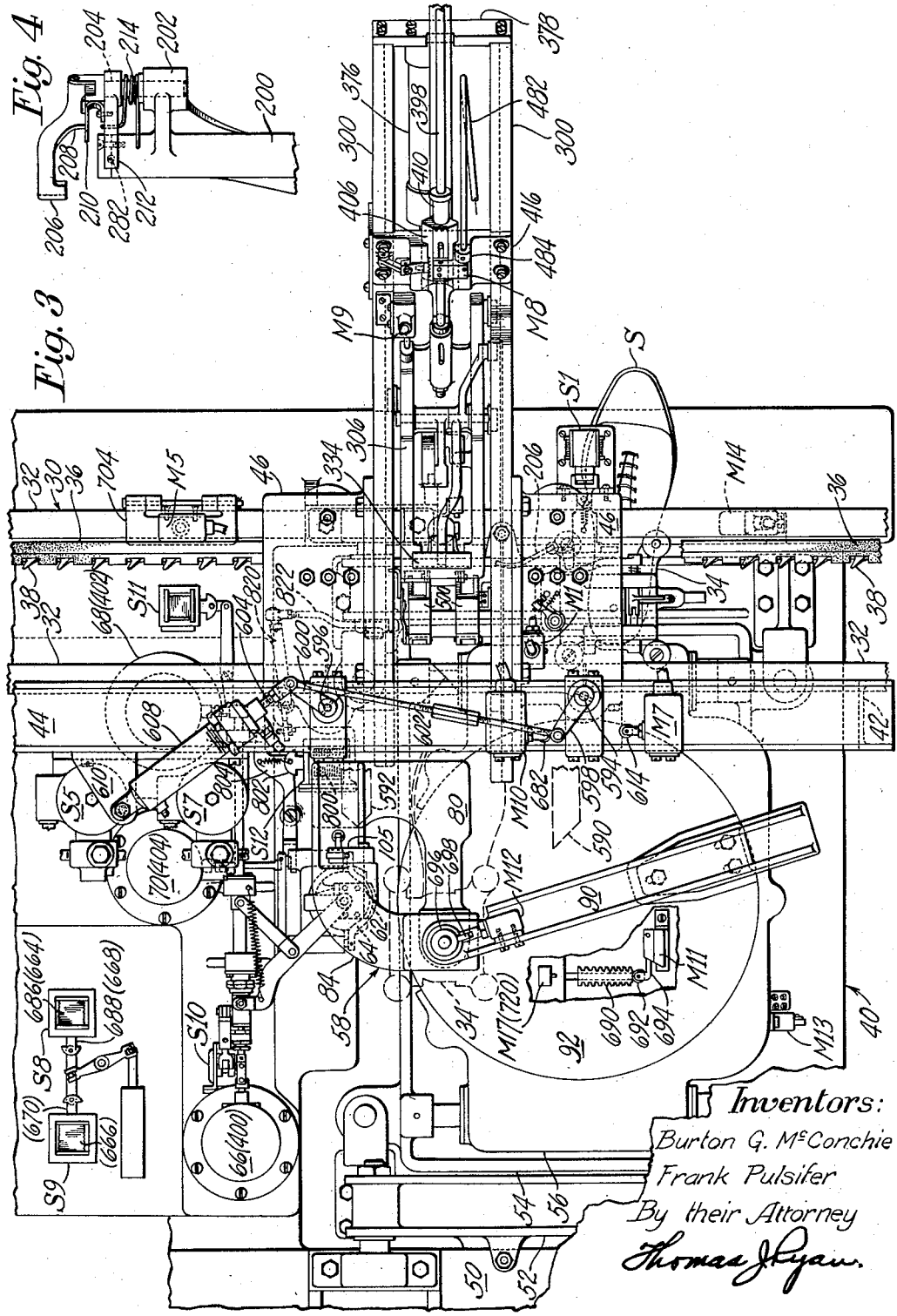

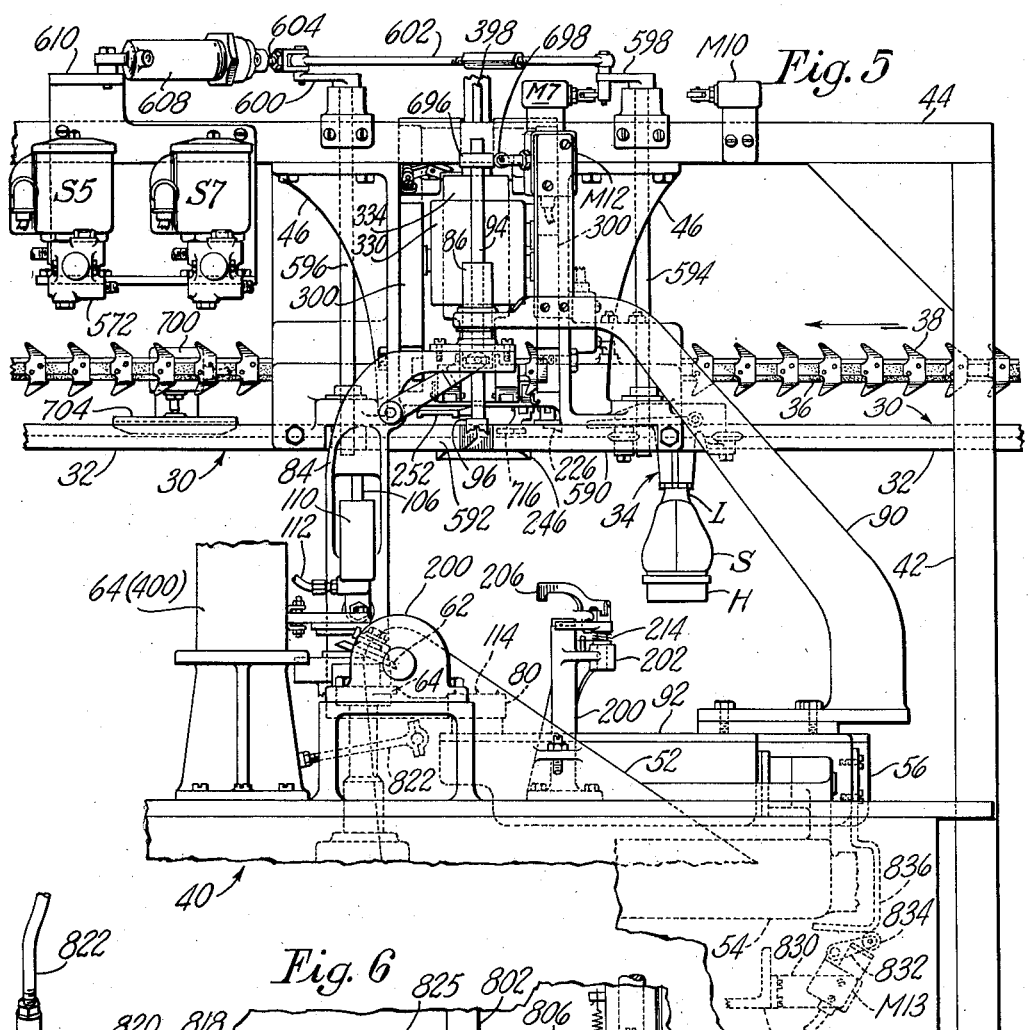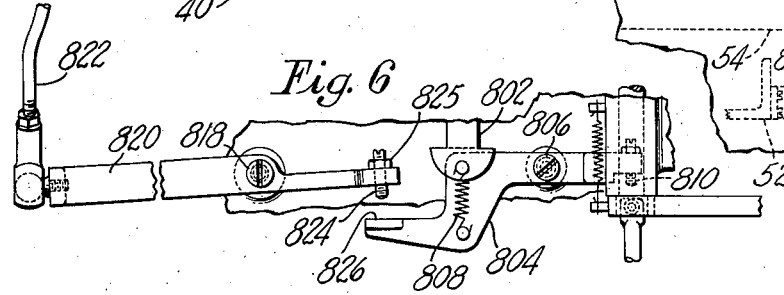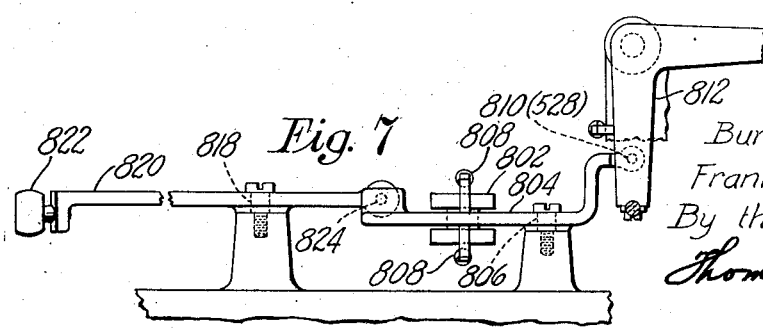

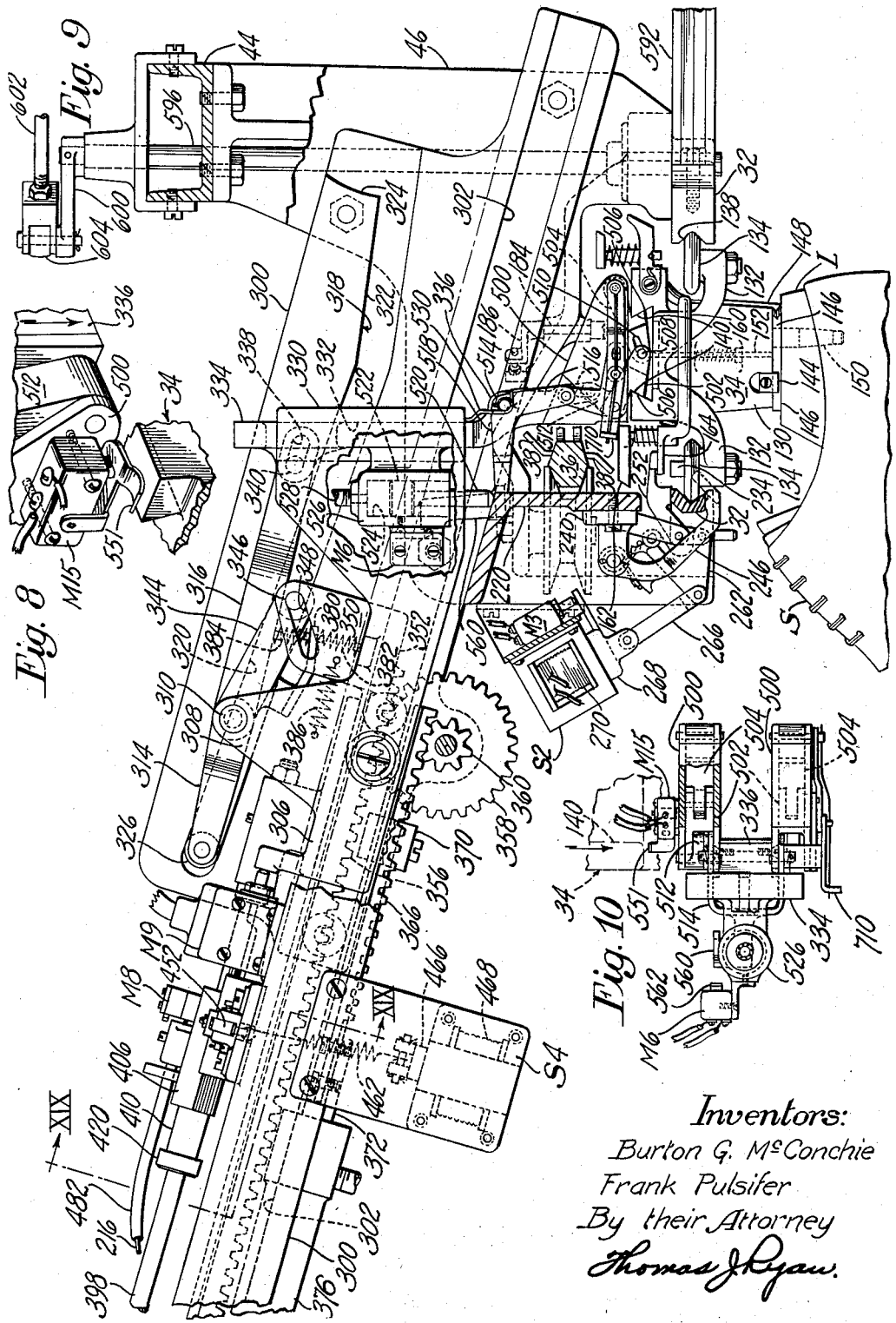

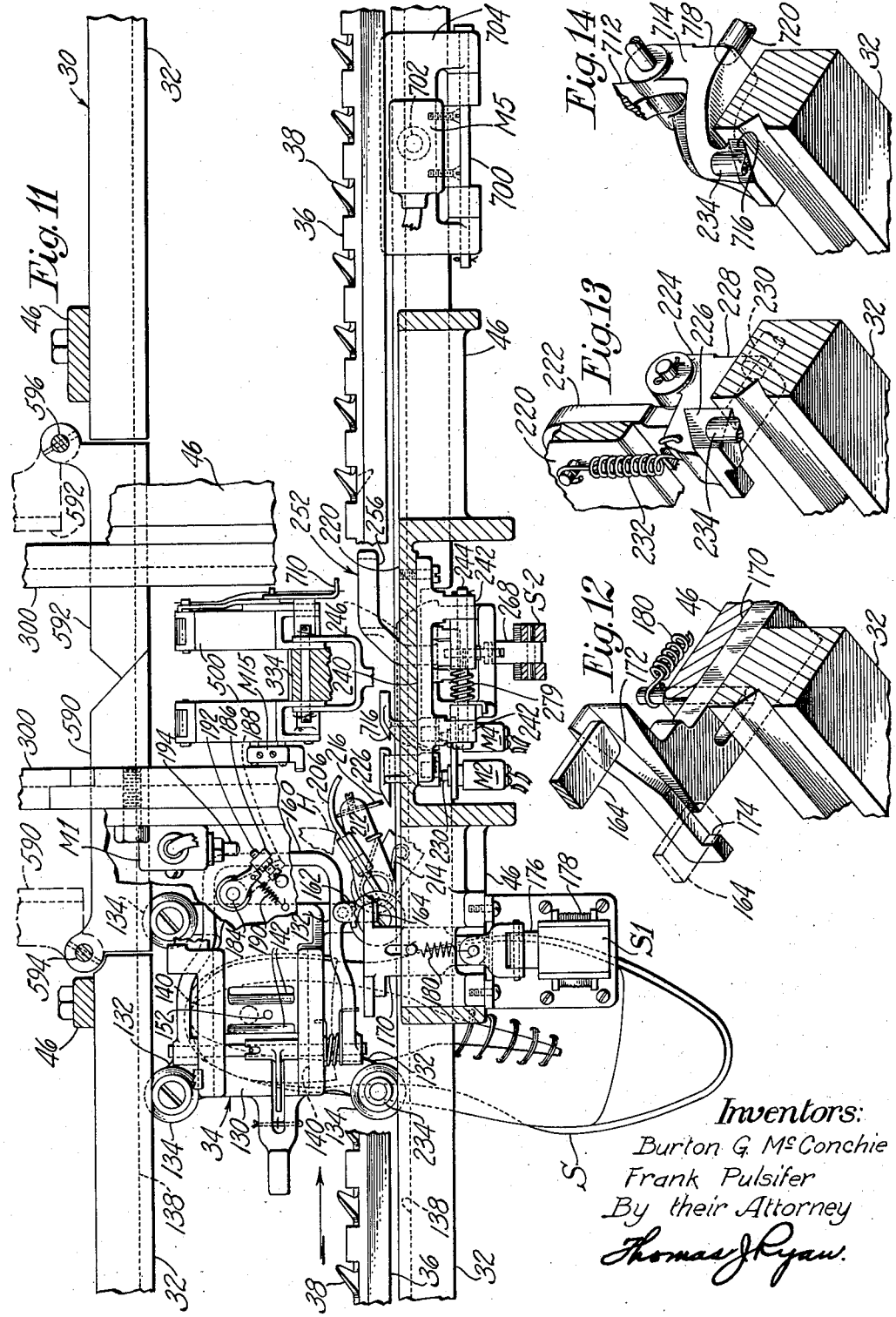

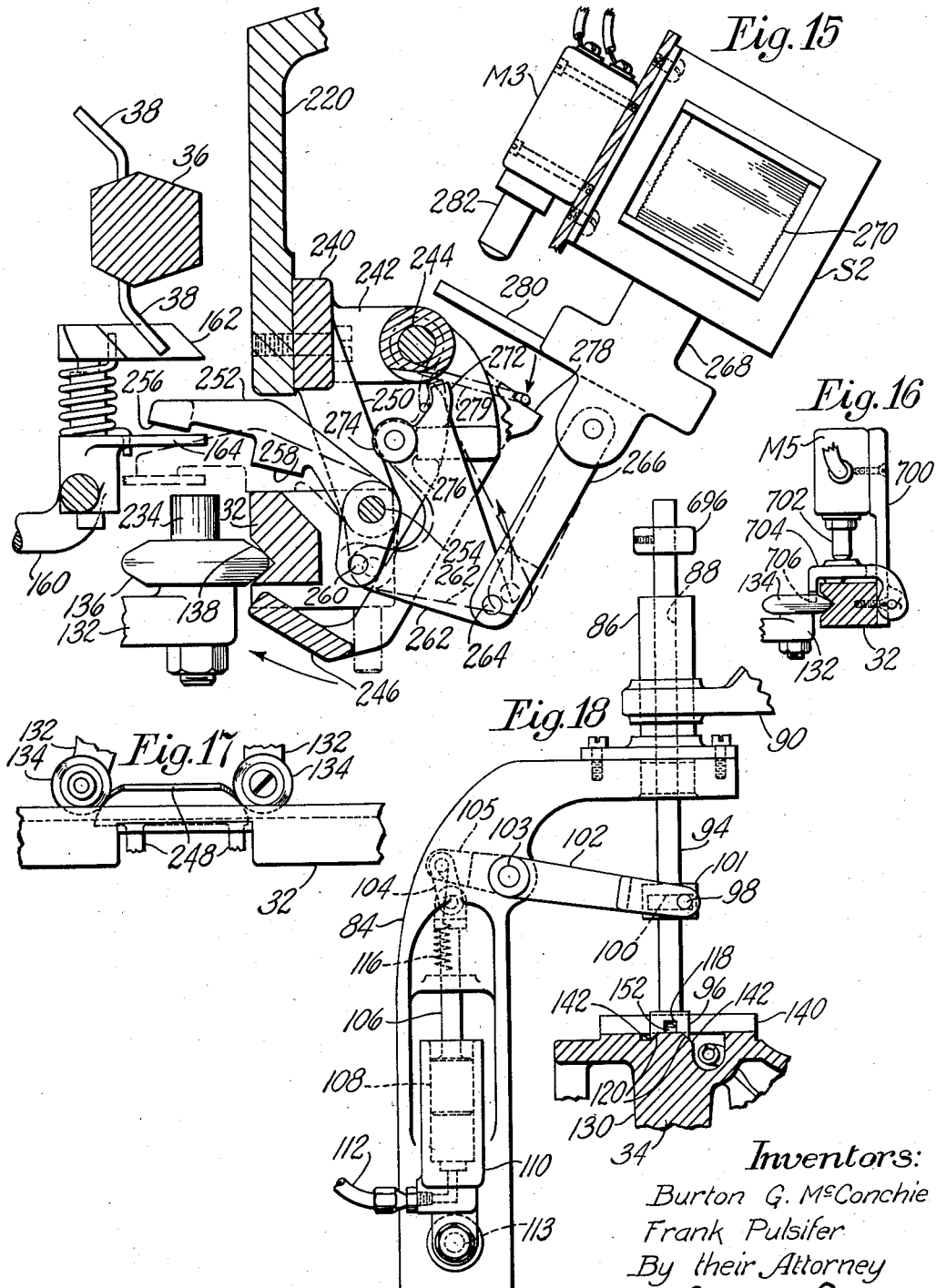

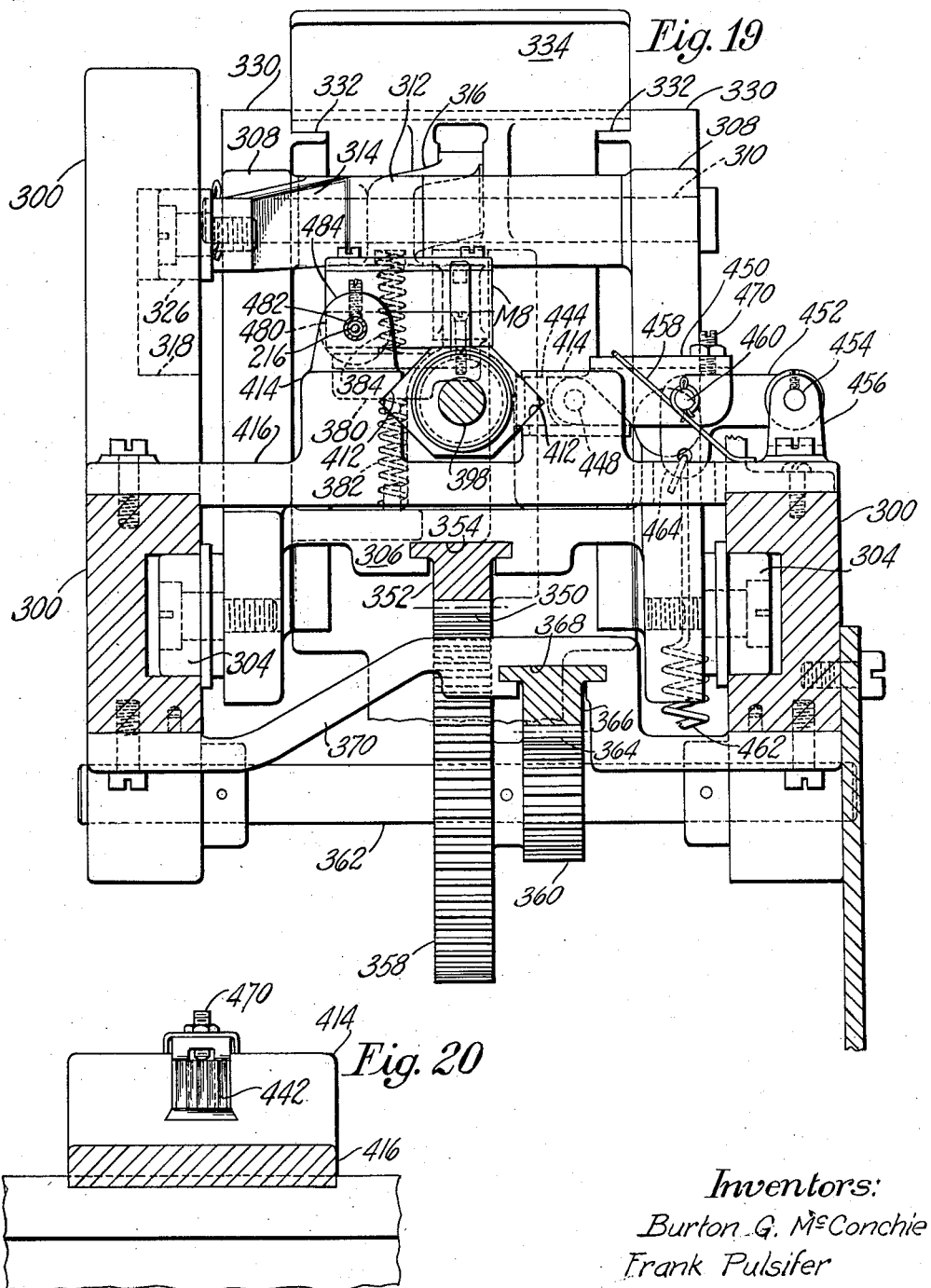

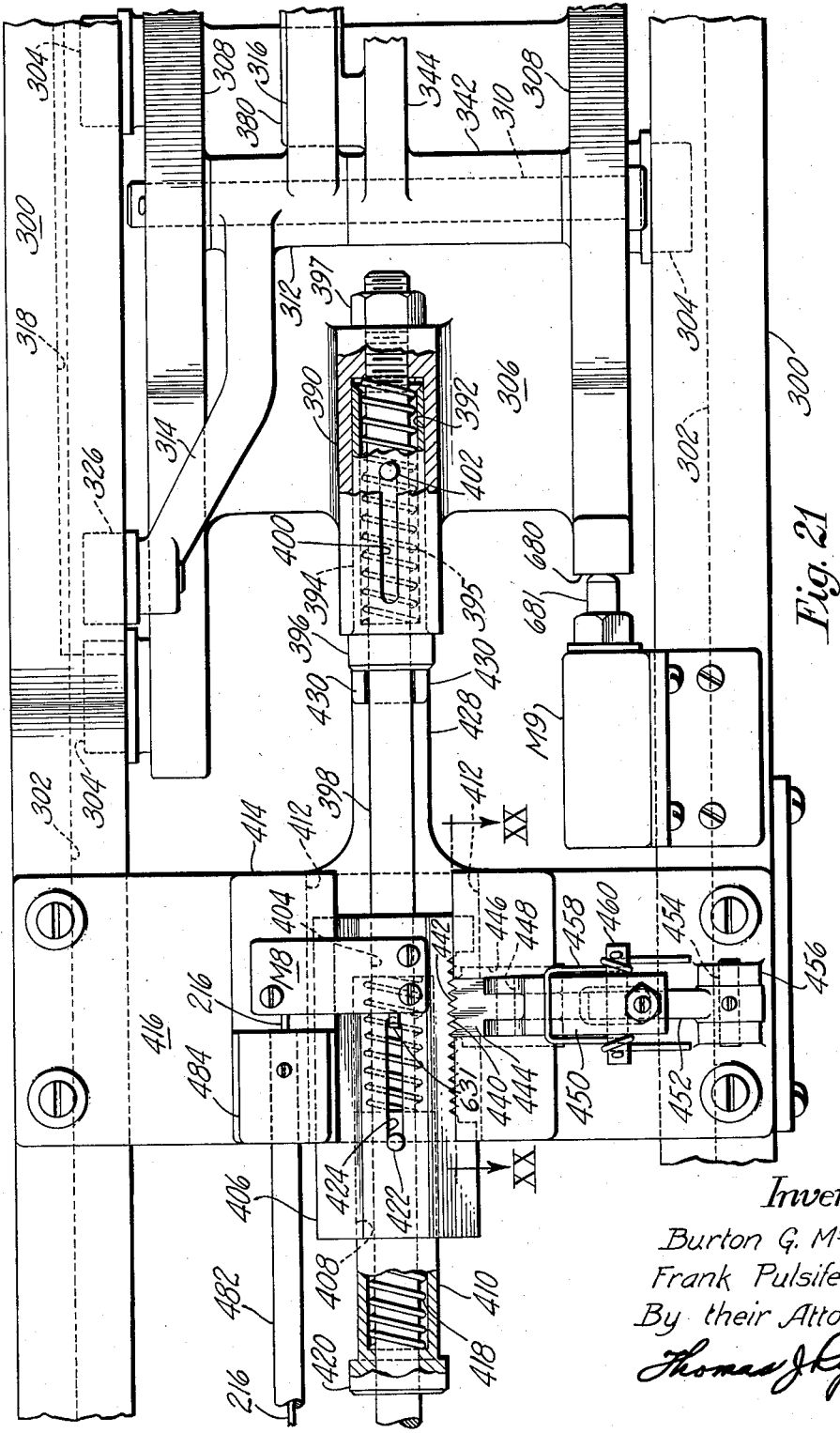

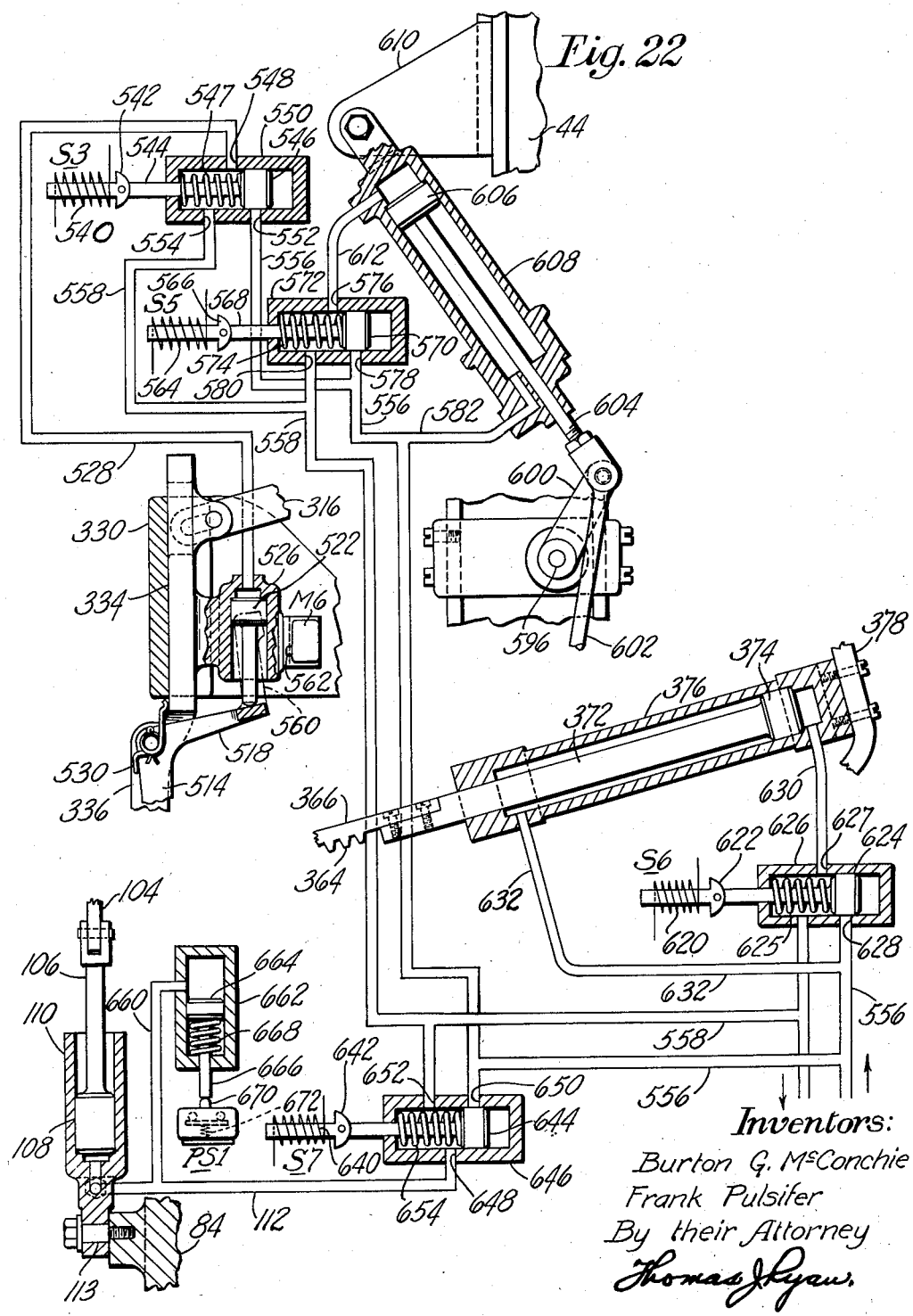

United States Patent Office 2,903,722
Patented Sept. 15, 1959

2,903,722

TRANSFER MECHANISM FOR WORK HANDLING APPARATUS

Burton G. McConchie, Bedford, and Frank Pulsifer, Hamilton, Mass., assignors to United Shoe Machinery Corporation, Flemington, N.J., a corporation of New Jersey Application May 3, 1956, Serial No. 582,512

52 Claims. (Cl. 12—1)

This invention relates to work handling apparatus and particularly to a novel mechanism for transferring a work carrying pallet from a work handling apparatus to the work holder of an automatic machine.

In an application for United States Letters Patent Serial No. 607,363, filed on August 31, 1956, in the name of Adolph S. Dorosz, there is disclosed a work handling apparatus for presenting a plurality of work carrying pallets, in succession, to a number of automatic machines. More particularly, the work handling apparatus of the mentioned application has a runway along which shoe carrying pallets are propelled for the purpose of presenting the pallets, in succession, to the work holders of a number of automatic shoe machines. In this arrangement, the mentioned runway is so disposed that the pallets, as they are propelled therealong, pass through a number of transfer stations, each transfer station being associated with one of the several automatic shoe machines, and it is a principal object of this invention to provide a novel and improved mechanism for transferring a work carrying pallet from a transfer station of a work handling apparatus to the work holder of an automatic machine.

With the aforementioned purpose in view and in accordance with a feature of this invention, there is associated with the herein illustrated work handling apparatus, which has a runway along which work carrying pallets are propelled, a transfer device having means for gripping a pallet and mounted for movement between a first position adjacent to the work handling apparatus and a second position adjacent to the work holder, together with operating mechanism for actuating a gate portion of the runway and for causing the transfer device in a series of successive operations to grip the pallet while in said first position, to move to said second position and deposit the pallet on the work holder, to release the pallet and move to said first position, to move again to said second position and grip the pallet, to return to said first position and deposit the pallet on the work handling apparatus, and finally to release the pallet to the action of said work handling apparatus. More particularly, the transfer mechanism which is herein illustrated as associated with an automatic heel trimming machine having a work holder for supporting and feeding a shoe during an automatic cycle of operations of the machine, is mounted for movement between a first position, adjacent to a transfer station of a work handling apparatus having a runway along which shoe carrying pallets are propelled, to a second position, adjacent to the work holder of the automatic heel trimming machine, while the operating mechanism which is arranged to be set into action by the arrival of a pallet at the transfer station is adapted to cause the transfer device in a series of successive operations to grip a pallet while in the first position, to move to the second position and deposit the pallet in a predetermined location on the work holder, to release the pallet and move to the first position, to initiate an operating cycle of the machine, to move again to said second position and grip the pallet at the conclusion of the operating cycle, to return to the first position and deposit the pallet on the work handling apparatus, and finally to release the pallet to the action of the work handling apparatus and to cause the gate portion of the runway to open and close in proper time relation to these operations of the transfer device.

The above and other more specific objects and features of the invention including novel means for varying the second position of the transfer device relatively to the work holder to accommodate shoes of different sizes, means for automatically clamping the work carrying pallet on the work holder and certain specific aspects of the transfer device itself, will appear in the following detailed description of the preferred embodiment of the invention, illustrated in the accompanying drawings, and will be pointed out in the claims.

In the drawings,

Fig. 1 is a view in side elevation, with certain parts in section, showing a transfer mechanism embodying the features of this invention and associated with a work handling apparatus and an automatic heel trimming machine;

Fig. 2 is a detail view of a portion of the heel trimming machine;

Fig. 3 is a plan view of the transfer mechanism, work handling apparatus and heel trimming machine shown in Fig. 1;

Fig. 4 is a detail view of a control member associated with the transfer mechanism;

Fig. 5 is a view in elevation of the transfer mechanism, work handling apparatus and heel trimming machine as seen looking from the left in Fig. 1;

Figs. 6 and 7 are views in plan and elevation, respectively, of a portion of a controlling mechanism associated with the heel trimming machine;

Fig. 8 is a perspective view of a portion of the transfer mechanism;

Fig. 9 is a view in side elevation of the transfer mechanism as seen from the rear of Fig. 1, this view being at an enlarged scale and having certain parts in section and others broken away;

Fig. 10 is a plan view of a portion of the transfer mechanism;

Fig. 11 is a plan view of a portion of the work handling apparatus;

Figs. 12, 13 and 14 are perspective views showing, respectively, three different control devices associated with the work handling mechanism, these devices being shown as viewed looking in the direction of the arrow in Fig. 1 and at an enlarged scale;

Fig. 15 is a view in vertical section and at an enlarged scale of another control device associated with the work handling apparatus;

Fig. 16 is a view, partly in vertical section, of still another control device associated with the work handling apparatus;

Fig. 17 is a plan view of a portion of the control device which is shown in section and at an enlarged scale in Fig. 15;

Fig. 18 is a view in elevation of a portion of a work holding mechanism associated with the heel trimming machine, as viewed from the left in Fig. 1, and at an enlarged scale;

Fig. 19 is a view in section substantially on line XIX—XIX of Fig. 9 and looking in the direction of the arrows, this view showing a poriton of the transfer mechanism at an enlarged scale;

Fig. 20 is a view in section substantially on line XX—XX of Fig. 21 and looking in the direction of the arrows, this view showing a detail of construction of the transfer mechanism;

Fig. 21 is a plan view of a portion of the transfer mechanism shown as viewed from above Fig. 9, and at an enlarged scale;

Fig. 22 is a schematic view of certain fluid pressure operated devices associated with the transfer mechanism and heel trimming machine.

Figure 23:
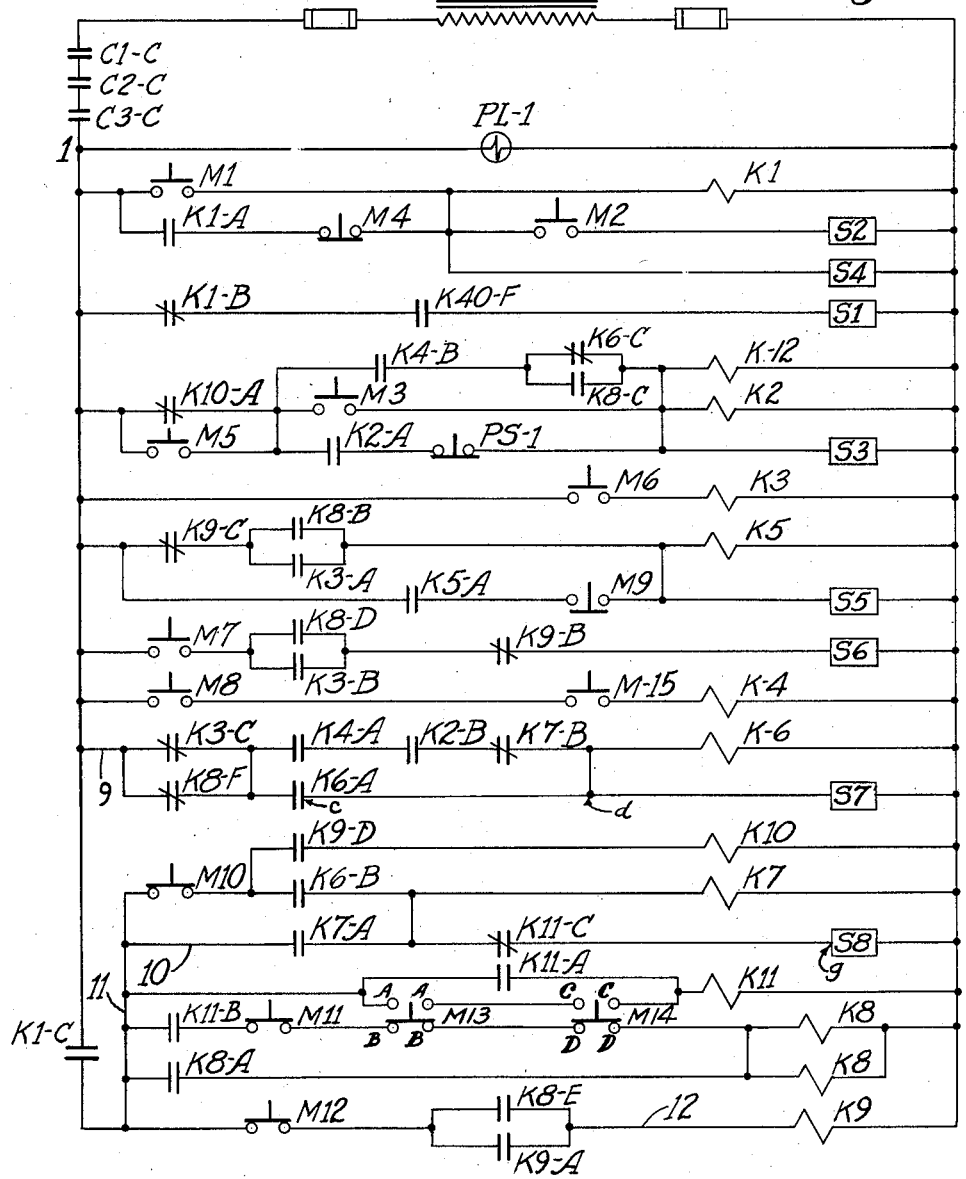
Figs. 23, 24 and 25 are electrical diagrams.

Referring to these drawings, and particularly Fig. 1 thereof, the transfer mechanism of this invention is shown as associated with a work handling apparatus of the type disclosed in the copending application for United States Letters Patent which is referred to above, and an automatic heel trimming machine similar to that disclosed and claimed in United States Letters Patent No. 2,644,968, issued on July 14, 1953 on an application filed in the names of Walter L. Benedict, Harry D. Goodnow, and Frank Pulsifer, the transfer mechanism being arranged to take one of a succession of several work carrying pallets from a transfer station of the work handling apparatus, to place the pallet on a work holder of the heel trimming machine, to withdraw to a position adjacent to the work handling apparatus, to initiate an automatic cycle of operations of the heel trimming machine, and at the conclusion of such operating cycle to remove the pallet from the work holder and return it to the work handling apparatus, this operation of the transfer mechanism being repeated as succeeding pallets enter and leave the transfer station of the work handling apparatus. As illustrated in these drawings, the work handling apparatus includes a runway, indicated generally by the reference character 30 and comprising two rails 32, 32 along which work carrying pallets, one of which is shown and indicated generally by the reference character 34, are propelled by means of a belt 36 to which there are secured in spaced relation a series of driving lugs 38, 38, Figs. 3, 5 and 11. Adjacent to the heel trimming machine, which is indicated generally by the reference character 40, the work handling apparatus is supported on a frame construction including vertical supporting members 42, one of which appears in Fig. 5, and a transversely extending member 44 to which there are secured two brackets 46, 46, the aforementioned rails 32 being supported on lower portions of these brackets, as shown in Fig. 9.

The heel trimming machine 40 has a main frame construction indicated by the reference character 50 on which there is mounted for pivotal swinging movement a base casting 52, a frame casting 54 which is supported on the base casting for vertical movement, and a table 56 which is mounted for horizontal sliding movement on the frame casting 54, Figs. 1 and 3, these three members corresponding respectively to the members 98, 86 and 72 of the aforementioned Benedict et al. patent. Associated with the table 56 is a work holder, indicated generally by the reference character 58, and corresponding to the work holder 50 of the mentioned patent, on which a shoe with an attached heel is supported during the operation of the machine in the course of which the heel is trimmed by a cutter 60, corresponding to the cutter 20 of the patented machine. As will be understood by reference to the mentioned patent, the work holder is revolved and rotated on the table 56 to pass the entire peripheral edge of the heel by the cutter 60, while the table 56 is moved in and out, relatively to the cutter, the frame casting 54 is moved up and down, relatively to the cutter, and the base casting 52 is swung about its pivotal mounting, by means of a plurality of fluid pressure operated motors which are controlled by means including a pair of shoe engaging feelers 62 and 64, Figs. 1 and 3 corresponding to the feelers 62 and 64 of the patented machine, and three fluid jet relays 66, 68 and 70, corresponding to the jet relays (400), (402) and (404) of the patented machine. With certain exceptions to be noted below, the heel trimming machine herein illustrated operates in exactly the same manner as is set forth in the aforementioned patent.

In place of the manually operated means for clamping a shoe on the work holder which was provided in the prior patented machine, the heel trimming machine herein illustrated has a power operated mechanism for clamping a shoe carrying pallet 34 on the work holder 58. The work holder comprises an L-shaped base plate 80 which corresponds to the base plate 60 of the patented machine, this plate being mounted for rotation on one end of a spider 82, a portion of which is visible in Fig. 1, which in turn is rotatably supported on and driven by mechanism contained within the table 56. Extending upwardly from the base plate 80 is a curved arm 84, Figs. 1, 3, 5 and 18, to the upper end of which there is secured a tubular member 86 having a central bore 88, see especially Fig. 18. Rotatably connected to this tubular member is the upper end of another curved arm 90 which at its lower end is supported on a cover plate 92, Fig. 3, secured to the spider 82, Fig. 1. Slidably mounted in the bore 88 of the tubular member 86 is a work clamping plunger 94 having at its lower end a work or pallet engaging abutment 96. Connected to this plunger, by means of a pin 98 which extends through a slot 100 formed in an enlarged portion 101 of the plunger, is the bifurcated end of an arm 102. This arm is fast on one end of a rockshaft 103, rotatably mounted on the arm 84 and carries at its other end a second arm 105 which is connected by means of a link 104 to a piston rod 106, formed integrally with a piston 108. This piston is received within a cylinder 110 which is mounted on the arm 84 by means of a stud 113.

As will be apparent, when fluid under pressure is admitted to the cylinder 110, below the piston 108, through a conduit 112 in response to the action of controlling means which will be described below, the plunger 94 will be moved downwardly to press the abutment 96 against a shoe carrying pallet 34 and thus to clamp the pallet, and also a shoe S on its last L mounted thereon, firmly against the base plate 80. To augment this clamping action, that portion of the base plate 80 against which the heel H of the shoe is pressed is provided with several pointed pins 114, Fig. 5, for engaging the tread surface of the heel. For elevating the plunger 94, when the operating fluid is exhausted from the cylinder 110, a coil spring 116 is connected to the arm 105, as shown in Figs. 1 and 18. The abutment 96 on the plunger 94 is formed with a transverse groove 118 and adjacent beveled side faces 120 for a purpose which will presently appear, and this abutment is held in a predetermined angular position by the action of the bifurcated end of the arm 102 on the opposite sides of the enlarged portion 101 of the plunger 94, Fig. 18.

Referring especially to Figs. 9 and 11, each pallet 34 comprises a base 130 from which there extend four legs 132 carrying wheels 134. These wheels have beveled peripheries 136 which fit into grooves 138 formed on the rails 32, see Fig. 15. Formed in the upper portion of each pallet is a dovetail guideway 140 which is used for a purpose which will presently appear, and between the opposite sides of this guideway the base 130 is provided with oppositely inclined surfaces 142, 142, Fig. 18, adapted to be engaged by the beveled side faces 120 on the abutment 96. Secured to the opposite sides of the lower end of the base 130 of each pallet is a lug 144 and these lugs are adapted to engage surfaces on the opposite sides of a positioning plate 146 on each last, which is detachably held on the pallet by means of a spring clip 148, Fig. 9. The particular functions of these lugs, as well as that of the positioning plate 146, to orient and to position a last and the shoe thereon, relatively to the pallet, are described in detail in United States Letters Patent No. 2,850,749, granted September 9, 1958, in the name of Adolph S. Dorosz, and inasmuch as these functions form no part of the present invention, such description need not be here repeated. It will be noted, however, that the base 130 of each pallet carries a last pin 150 and a sensing rod 152, Fig. 9, the latter of which is arranged to be elevated above a flat surface on the upper portion of the base 130, located between the inclined surfaces 142, 142, when a last is mounted on the pallet, Fig. 18, the upper end of this pin entering into the groove 118 of the abutment 96. Pivotally mounted on the base portion 130 of each pallet is a U-shaped bail 160 which carries a drive finger 162 and a deflecting plate 164, Figs. 9, 11 and 15.

When a pallet is being propelled along the runway 30 by the belt 36, this bail is swung yieldingly into a position to locate the drive finger 162 in line with the lugs 38 on the belt 36, see Fig. 15. As each pallet approaches the transfer station of the work handling apparatus it enters what may be called the hold-back station, see Fig. 11. Slidably mounted on the lower portion of one of the brackets 46, Fig. 12, is a bar 170 which is formed on its inner end with a camming surface 172 and a stop shoulder 174. This bar is connected at its outer end to the armature 176 of a solenoid S1, having a coil 178, Fig. 11. When this solenoid is deenergized, a coil spring 180 moves the bar to the position in which it is shown in Fig. 12. Therefore, as the pallet enters the hold-back station, the deflecting plate 164 engages the camming surface 172 and is moved downwardly, thereby lowering the drive finger 162 beyond the lug 38 of the belt 36 and disconnecting the pallet from the belt so that movement of the pallet is arrested when the deflecting plate comes into contact with the stop shoulder 174, see broken line showing in Fig. 12. Located just beyond the hold-back station, considered in the direction in which the pallets travel along the runway 30, see arrow Fig. 11, is the transfer station and, as will be explained in more detail below, the exit of a pallet from this transfer station operates control mechanism which, among other functions, energizes the coil 178 of the solenoid S1. As a result of such energization of this solenoid, the bar 170 will be withdrawn from engagement with the deflecting plate 164, thereby releasing the pallet and returning the drive finger 162 to a position to be engaged by one of the lugs 38 of the belt 36. The next succeeding pallet is now moved from the hold-back station into the transfer station.

Journaled in a laterally extending portion of one of the brackets 46, Fig. 11, is a vertical shaft 184 which has mounted on its upper end an arm 186 and on its lower end an arm 188. A coil spring 190 normally holds these arms in the positions in which they are shown in Fig. 11 so that an adjustable abutment screw 192, carried by the arm 186, is displaced from the operating plunger 194 of a microswitch M1. As a pallet travels from the hold-back station to the transfer station, the upper end of the sensing rod 152, if it is elevated by the last of a shoe on the pallet, will engage the arm 188 and cause the switch M1 to be closed momentarily. As will be explained in more detail below, this causes the coil of the solenoid S1 to be deenergized thereby permitting the spring 180 to return the bar 170 to the position shown in Fig. 12. Accordingly, the next succeeding pallet will be detained in the hold-back station in the manner explained above.

Mounted on a portion of the frame 50 of the heel trimming machine is a bracket 200, Fig. 5, having near its upper end an offset boss 202, Fig. 4, which carries a rotatable stub shaft 204. Pivotally mounted on the upper end of this shaft is a feeler arm 206 which has a downwardly projecting lug 208 adapted to rest on a spring abutment 210 carried by a second arm 212. This second arm is secured to the shaft 204 so that movement of the feeler arm is transmitted thereto, both of these arms being yieldingly urged in a counterclockwise direction, as viewed in Fig. 11, by means of a coil spring 214. Connected to the arm 212 is a Bowden wire 216 which is adapted, as will be explained below, to set a control mechanism associated with the transfer mechanism, in accordance with the angular position to which the feeler arm 206 is swung, against the resistance of the spring 214, by the breast face of the heel H of the shoe S on the pallet as the pallet travels from the hold-back station to the transfer station, see Fig. 11 and also Fig. 1.

As is shown in Fig. 11, the two brackets 46 are joined together at their lower ends, in the vicinity of the transfer station, by a web casting 220. Pivotally mounted on the lower end of a bracket 222, secured to the web casting 220, is a control block 224 which is provided on one side with a camming surface 226, Fig. 13, and see also Fig. 11. Another side 228 of this block is in engagement with the operating plunger 230 of a microswitch M2. A coil spring 232 is arranged to hold the block yieldingly in the position in which it is shown in Fig. 13 and when the block is in this position the switch M2 is open. As viewed in Fig. 11, the wheel 134, which is on the lower left-hand leg of the pallet 34, is mounted on a stud 234 which extends upwardly beyond the wheel, see also Fig. 15. Thus, as the pallet arrives at the transfer station, this stud will engage the camming surface 226 and swing the block 224 in a direction to close the switch M2. Secured to the web portion 220 which extends between the brackets 46, 46 is another bracket 240 having two parallel spaced outstanding arms 242, 242 in the outer ends of which there is supported a shaft 244, Figs. 11 and 15. Pivotally mounted on this shaft is a pallet alining arm 246, this arm being cut away as indicated at 248 in Fig. 17, and shaped as shown in that figure so as to fit between adjacent wheels 134, 134 of the pallet. The bracket 240 is also provided with two other arms 250, 250 between the lower ends of which a pallet release lever 252 is pivotally mounted on a shaft 254, Fig. 15. One arm of this lever has an offset extension 256, Fig. 11, and a stop abutment 258, Fig. 15, while the other arm thereof is connected by means of a pin 260 to one of the lower corners of a triangular link 262. The other lower corner of this triangular link is connected by means of a pin 264 and a link 266 to the armature 268 of a solenoid S2 which has a coil 270. Adjacent to the upper corner 272 of this triangular link, which upper corner is formed in the shape of a hook, there is mounted a roller 274 which is in line with an abutment 276 formed on a portion of the pallet alining arm 246.

As will be explained in more detail below, the closing of the switch M2 causes the coil 270 of the solenoid S2 to be energized. As a result of such energization of this solenoid, its armature will be moved upwardly, Fig. 15, and the triangular link will first be swung in a counterclockwise direction about the axis of the roller 274, thus causing the release lever 252 to be swung in the same direction down to the dotted line position shown in Fig. 15, such movement of this lever, which is limited by the engagement of the stop abutment 258 with the top of a rail 32, depressing the deflecting plate 164 and releasing the pallet from the propelling belt 36. The continued movement of the armature now swings the triangular link 262 about the axis of the pin 260 so that the roller 274 moves away from the abutment 276. Interposed between the hook-shaped upper corner 272 of the link 262 and an abutment surface 278, formed on a portion of the pallet alining arm 246, is a coil spring 279 through which the movement of the triangular link is yieldingly transmitted to the arm 246 which is eventually brought to the position in which it is shown in Fig. 17 and with its operating end wedged between adjacent wheels of the pallet. Just as the armature 268 completes its movement and the pallet alining arm reaches the position shown in Fig. 17, a finger 280, secured to the armature, engages the plunger 282 of a microswitch M3, thereby closing this switch. As a result of the closing of the switch M3, a cycle of operations of the transfer mechanism is initiated and during this operating cycle, which will be described in detail below, the pallet is removed from the runway 30, placed on the work holder 58 of the heel trimming machine 40 and, after a cycle of operations of the heel trimming machine has been completed, in a manner to be described below, the pallet is returned to the runway by the transfer mechanism and reconnected to the propelling belt which carries it away from the transfer station.

Referring to Fig. 9, the transfer mechanism is supported on a pair of side plates 300, see Fig. 11, which are secured to the two brackets 46, 46. Formed on the inwardly facing sides of these two plates are inclined runways 302, 302 in which are received three wheels 304, journaled on a carriage 306, Figs. 19 and 21. Rising from the opposite sides of this carriage are two webs 308, 308 and extending between these webs is a cross shaft 310 on which there is mounted the hub 312 of a lever having two arms 314, 316. One of the side plates 300 has an upwardly extending portion in which there is a cam track indicated generally by the reference character 318, Fig. 9, this cam track having a downwardly sloping portion 320, an upwardly sloping portion 322 and a cutaway portion 324, in which there is received a cam roll 326 mounted on the end of the arm 314 of the aforementioned lever. At its right-hand end, as viewed in Fig. 9, the carriage 306 extends upwardly as indicated at 330, and in this upwardly extending portion there is formed a guideway 332. Slidably mounted in this guideway is the upper part 334 of a pallet gripping device having a lower portion 336. Formed in the outer end of the arm 316 of the aforementioned lever is a slot 338 through which there projects a pin 340 which is carried by ears formed on the upper part 334 of the pallet gripping device. Also mounted on the cross shaft 310 is a second hub member 342 from which there extends an arm 344 carrying at its outer end a pin 346, see Fig. 9. This pin projects into an inclined slot 348 formed in a web portion 350 which extends upwardly from a rack 352. This rack is slidably mounted in a guideway 354, formed in the lower portion of the carriage 306, Fig. 19, and is provided with teeth 356 which are in mesh with the teeth of a gear 358. This gear is formed integrally with a pinion 360 and the gear and pinion are pinned to a shaft 362 which is journaled at its opposite ends in the side plates 300, 300. The teeth of the pinion 360 are in mesh with teeth 364 of a second rack 366 which is slidably mounted in a guideway 368 formed on a crosspiece 370, secured to the side plates 300, 300. At its upper left-hand end, as viewed in Fig. 9, this rack is secured to the rod 372 of a piston 374 which is received in a cylinder 376, see Fig. 22. The cylinder 376 is secured at one of its ends to a crosspiece 378 which joins together the outer ends of the side plates 300, 300, see Fig. 3. As will be apparent, when fluid under pressure is admitted to the upper end of this cylinder, i.e., the right-hand end as viewed in Fig. 22, the racks 366 and 352 will both be moved downwardly and to the right, Fig. 9, the rack 352 traveling at a greater speed and for a greater distance than the rack 366 because of the differences in diameter of the gear 358 and the pinion 360.

Formed integrally with the arm 344 is a downwardly and laterally offset abutment 380, Fig. 21, and interposed between the lower side of this abutment and a portion of the carriage 306 is a compression spring 382, Fig. 9. Arranged substantially in alinement with this spring, but on the upper side of this abutment, is another compression spring 384 which bears at its upper end against the lower side of the arm 316. Stretched between the web 350 and one of the webs 308 on the carriage 306 is a relatively light coil spring 386 which tends to hold the parts in the positions shown in Fig. 9 and with the pin 346 bearing against the right-hand end of the slot 348. As the rack 352 is moved downwardly and to the right as viewed in Fig. 9, the carriage 306 will also travel in the same direction, being pulled along partly by the action of the spring 386 and partly by the action of the spring 382, abutment 380, pin 346 and inclined slot 348. The cam roll 326 now moves along the cam track 318 and, due to the shape of the oppositely inclined portions 320, 322 of this cam track, the arm 316 is first elevated and then depressed, the purpose of these movements of the arm 316 being to lift the pallet gripping device, the pallet gripped thereby and the shoe on the pallet over an obstructing portion of the heel trimming machine. Eventually, the carriage 306 moves to a location where the cam roll 326 reaches the cut-away portion 324 of the cam track 318. Further movement of the carriage is now prevented in a manner about to be explained and, as the rack 352 continues to move in the same direction, the pin 346 will ride downwardly along the slot 348 thereby releasing the arm 316 so that the pallet gripping device, pallet and shoe may be lowered by gravity until the heel H of the shoe comes into engagement with the heel end of the base plate 80 of the shoe holder. When fluid under pressure is admitted to the opposite end of the cylinder 376, i.e., the left-hand end as viewed in Fig. 22, the rack 352 will be moved to the left, Fig. 9, and the pin 346 will ride upwardly along the slot 348 thereby elevating the arm 316, yieldingly through the action of the spring 384 and depressing the arm 314 to bring the cam roll 326 again into alinement with the portion 322 of the cam track 318. Upon the continued movement of the rack 352 the carriage 306 is returned to its original position as shown in Fig. 9.

The extent of movement of the carriage in each direction is controlled in the following manner. Formed on the carriage 306 is a boss 390 having a bore 392 in which there is slidably received a hollow sleeve 394. This sleeve is provided with an enlarged end 396 which, when the parts are in the positions shown in Fig. 21, is in engagement with one end of the boss 390, this sleeve enclosing a compression spring 395 as shown in Fig. 21. Threaded into the other end of this boss and held in place by means of a locknut 397 is a rod 398 which extends outwardly through the sleeve 394. The boss 390 is provided with a slot 400 through which a pin 402, carried by the sleeve 394, projects. The rod 398 also extends through a bore 404 formed in a block 406 and slidably mounted in an enlarged portion 408 of this bore is a hollow sleeve 410. The block 406 is slidably mounted in guideways 412, formed in an upstanding portion 414 of a cross member 416 which is mounted at its opposite ends on the side plates 300, Fig. 19. The sleeve 410 contains a compression spring 418 which yieldingly urges the sleeve to the left, Fig. 21, and this sleeve has an enlarged end 420. Secured to the sleeve 410 is a pin 422 which projects outwardly through a slot 424 in the block 406. At its extreme outer end, see Fig. 1, the rod 398 is threaded to receive a stop nut 426. Extending from one side of the cross member 416 is an arm 428 having a pair of upstanding ears 430, 430 thereon, Fig. 21, between which the rod 398 extends. As will be apparent, these ears serve as stops for limiting the movement of the carriage 306 in one direction, i.e., to the left as viewed in Fig. 21, by the engagement with these ears of the enlarged end 396 of the sleeve 394 and of this enlarged end of the sleeve with the left-hand end of the boss 390, the spring 395 serving to cushion the action of these stop means in a manner which will be apparent. Movement of the carriage 306 in the other direction, i.e., to the right as viewed in Fig. 21, is limited in a similar manner by the engagement of the stop nut 426 on the outer end of the rod 398 with the enlarged end 420 of the sleeve 410 and of this enlarged end of the sleeve with the left-hand end of the block 406, the spring 418 serving to cushion the action of these stop members.

The block 406 is provided along one of its sides with a series of teeth 440 which are normally engaged by matching teeth 442 formed on a locking plunger 444, Fig. 21. This locking plunger is slidably mounted in a guideway 446 formed in the upstanding portion 414 of the cross member 416, and connected to this plunger by means of a pin 448 is one end of a toggle formed of two links 450, 452, the other end of this toggle being connected to a pin 454 mounted in ears 456 which extend upwardly from one end of the cross member 416, Fig. 19. A grasshopper spring 458, which is wound around the opposite ends of a pin 460 joining the two toggle links 450, 452, yieldingly tends to break the toggle formed by these links, such action, however, being prevented by the force of a stronger spring 462 which extends between a downwardly extending ear 464 formed on the link 452, and the armature 466 of a solenoid S4, Figs. 1 and 9, when the coil 468 of this armature is energized. An adjustable stop screw 470 is provided, Fig. 19, for limiting the straightening movement of the toggle and hence for varying the extent of engagement of the teeth 440, 442. Secured to the block 406 is a laterally extending arm 480 on the upper side of which there is supported a microswitch M8, and connected to this arm is one end of the Bowden wire 216, referred to above. This Bowden wire is enclosed within a casing 482 one end of which is mounted in a boss 484 formed in the upstanding portion 414 of the cross member 416. At its other end, this casing is secured to the upper end of the bracket 200, see Fig. 4.

It will be recalled that as each shoe carrying pallet travels from the hold-back station to the transfer station, the switch M1 is momentarily closed. At this same instant, the feeler arm 206 is swung in a clockwise direction, Fig. 11, and to an extent determined by the breast surface of the heel H of the shoe on the pallet. The closing of this switch energizes a relay to be referred to below, which is electrically maintained by means of a holding circuit, also to be discussed below, and this relay causes the solenoid S4 to be energized. Now, as the feeler arm 206 is swung by the heel H, the block 406 will be moved along the guideways 412 to a position determined by the location of the breast surface of the heel relatively to the pallet 34, the toggle formed by links 450, 452 at this time being broken and the locking plunger 444 withdrawn from engagement with the block 406. The energization of solenoid S4, however, immediately locks the block 406 in the position to which it has thus been moved. Therefore, when the carriage 306 is moved downwardly and to the right, as viewed in Fig. 9, in the maner explained above, the extent of such movement will be determined by the position of the block 406, the stop nut 426 on the rod engaging the left-hand end of the sleeve 410 and moving this sleeve to the right, Fig. 21, against the action of the spring 418, until the enlarged end 420 of the sleeve engages the left-hand end of this block. It will be observed that the Bowden wire 216 actually turns back on itself, Fig. 1, so that the more the breast surface of the heel H extends to the right, as viewed in this figure, the greater will be the resulting displacement of the block 406 to the left, Fig. 1 (to the right in Figs. 9 and 21). It will, therefore, be understood that, regardless of the position of the breast surface of the heel H of the shoe on each succeeding pallet which, of course, will be different for shoes of different sizes, as the pallet and shoe are transferred from the runway 30 to the work holder 58 of the heel trimming machine, the breast surface of every heel will assume the same relative position to the worker holder. Accordingly, when the heel trimming machine is set into operation, trimming action of the cutter 60 will commence in the same location, relatively to the corner of the breast line on that side of the shoe and, as will appear below, the trimming action will be terminated in the same location, relatively to the corner of the breast line on the opposite side of the shoe.

Referring particularly to Figs. 9, 10 and 11, the lower portion 336 of the pallet gripping device is generally U-shaped and comprises two channel-like arms 500, 500, Figs. 10 and 11. Pivotally mounted within each of these channel-like arms is a pair of parallel gripping arms 502, 504 each provided with an inclined gripping surface 506, Fig. 9. The arms of each pair are connected by a pin 508 carried by one arm and extending through a slot 510 in the other arm. The arms 502 of each pair have upwardly extending portions 512 by means of which the pair of arms may be swung from the pallet gripping position in which they are shown in Fig. 9 to a pallet releasing position in which the gripping surfaces 506 are moved toward each other within the confines of the inclined side walls of the dovetail guideway 140 which is formed in each pallet. For thus moving these gripping arms, there is pivotally mounted on the lower portion 336 of the pallet gripping device a multi-armed bell-crank lever 514 having a pair of arms 516 which extend downwardly and are connected at their lower ends to the upwardly extending portions 512 of the arms 506. This bell-crank lever has a rearwardly extending arm 518 which is in engagement with the lower end of a piston rod 520 formed integrally with a piston 522. This piston is slidably received within a cylinder 524, formed in a block 526 which is carried by the upper portion 334 of the pallet gripping device, see also Fig. 22. As will be apparent, when fluid under pressure is admitted to the space in the cylinder 524, above the piston 522, through a duct 528, the bell-crank lever 514 will be swung in a counterclockwise direction, Fig. 9, clockwise direction in Fig. 22, against the resistance of a grasshopper spring 530, to move the pallet gripping arms 502, 504 to the gripping positions in which they are shown in Fig. 9. On the other hand, when the duct 528 is connected to exhaust, the spring 530 will swing the bell-crank lever 514 in the other direction and move the arms 502, 504 to the pallet releasing position in which the gripping surfaces 506, 506 are withdrawn from engagement with the side walls of the dovetail guideway 140.

As explained above, when the pallet which has just entered the transfer station has been centered by the action of the pallet lining arm 246, as a result of the energizing of the solenoid S2, the switch M3, Fig. 15, is closed. The closing of this switch causes a coil 540 of a solnoid S3, Fig. 22, to be energized so that its armature 542, which is connected to the stem 544 of a valve member 546, moves this valve member to the left against the resistance of a return spring 547, thereby connecting the duct 528, through a port 548 in a valve casing 550, to a port 552 in the valve casing and simultaneously disconnecting the port 548 from an exhaust port 554. As is diagrammatically illustrated in Fig. 22, the port 552 is connected to a pressure line 556, while the port 554 is connected to an exhaust line 558. Thus, the entering pallet, which has moved into cooperative relation with the pallet gripping device while the pallet gripping arms thereof were in a pallet releasing position, will be gripped by these arms. Referring to Figs. 8 and 10, there is mounted on one side of the pallet gripping device a microswitch M15 having a pivotally supported operating arm 551 which is elevated by a cam surface 553 on the pallet to close the switch M15 by the entering pallet. As will appear below, this switch is provided in order to prevent operation of the pallet gripping device when there is no pallet in position to be gripped. The arm 518 of the bell-crank lever 514 has an upwardly extending portion 560, Figs. 9 and 22, which, when the pallet has been gripped in the above manner, engages the operating plunger 562 of a microswitch M6 and closes this switch. As a result of the closure of this switch, the coil 564 of a solenoid S5, Fig. 22, is energized and its armature 566, which is connected to the stem 568 of a valve member 570 slidably received within a valve casing 572, is moved to the left, against the resistance of a return spring 574, thereby connecting a port 576 to a pressure inlet port 578 and disconnecting the port 576 from an exhaust port 580. The port 580 is connected to the exhaust line 558, Fig. 22, while the port 578 is connected to the pressure line 556 which has a branch portion 582 to be referred to below.

One of the rails 32 of the runway 30, Fig. 11, is interrupted by a gate portion comprising two sections 590, 592, which are secured, respectively, to the lower ends of two rods 594, 596, journaled in bearing portions formed on the brackets 46, 46, Fig. 5. Fast on the upper end of the rod 594 is an arm 598 and fast on the upper end of the rod 596 is an arm 600, Fig. 3, these two arms being joined together by an adjustable link 602. Connected to the arm 600 is the end of a piston rod 604 which has formed integrally therewith a piston 606, slidably received within a cylinder 608, Fig. 22. This cylinder is pivotally mounted at one end on a bracket member 610 which is secured to the frame member 44. The branch portion 582 of the pressure line 556 is connected to that end of the cylinder 608 which contains the piston rod 604, while the port 576 is connected to the other end of this cylinder by means of a duct 612. As will be apparent, when the valve member 570 is moved to the left, as above explained, the force exerted on the upper side of the piston 606 by the fluid under pressure admitted to the cylinder through the duct 612 will exceed that exerted on the lower side of this piston by the pressure of the fluid admitted to the cylinder through the branch portion 582 of the pressure line so that this piston will be moved downwardly to swing the two gate members 590, 592 from the closed positions in which they are shown in Fig. 11 to the open positions in which they are shown in broken lines in Fig. 3. Just as these two gate members reach their open positions, the arm 598 strikes a roller 614 carried by the plunger of a microswitch M7 and closes this switch.

As a result of the closing of the switch M7, the coil 620 of a solenoid S6, having an armature 622, is energized, Fig. 22. This armature is connected to a valve plunger 624 which is slidable within a valve housing 626 against the resistance of a return spring 625. When the coil 620 is thus energized, the valve plunger 624 is moved to the left thereby connecting an outlet port 627 to an inlet port 628 which is in communication with the pressure line 556. The outlet port 627 is connected by means of a duct 630 to the upper end of the cylinder 376 on the side of the piston 374 therein opposite to the piston rod 372. A branch portion 632 of the pressure line 556 is connected to the other, or lower, end of this cylinder. Accordingly, when the coil of the solenoid S6 is energized, the piston 374 will be moved (to the left as viewed in Fig. 22 and to the right as viewed in Fig. 9), by the unbalanced forces acting on the piston 374.

As has been explained above, when the piston 374 is moved in the aforementioned direction, the carriage 306 will be operated to transfer the pallet 34 and the shoe S carried thereby from the position shown in full lines in Fig. 1 to the position shown in broken lines in Fig. 1. As the carriage 306 completes its movement in this direction, the pin 422, Fig. 21, strikes a plunger 631 of the microswitch M8 and closes this switch. As a result of the closing of the switch M8, the coil 640 of a solenoid S7 is energized. This solenoid has an armature 642 which is connected to the stem of a valve plunger 644, slidably mounted within a valve housing 646, Fig. 22. The duct 112, previously described as connected to the cylinder 110, is also connected to a port 648 formed in the valve housing 646, in which there are also two other ports, 650 which is connected to the pressure line 556 and 652 which is connected to the exhaust line 558. Therefore, when the solenoid S7 is energized, the valve plunger 644 will be moved to the left, against the action of a return spring 654, so that fluid under pressure is admitted to the cylinder 110, beneath the piston 108, and the clamping plunger 94 is operated to clamp the pallet 34 and shoe S firmly on the work holder 58, Fig. 18. The duct 112 is provided with a branch portion 660 which is connected to a cylinder 662, Fig. 22. In this cylinder there is a piston 664 having a plunger 666, this piston being held yieldingly in an elevated position by means of a spring 668 with its plunger in alinement with but spaced from the operating plunger 670 of a microswitch PS1, normally held closed by a spring 672. When the pallet and shoe have been clamped on the work holder, the pressure of the fluid within the cylinder 622 will rise and force the plunger 666 downwardly against the resistance of the spring 668, thereby opening the switch PS1.

The opening of switch PS1 causes the solenoid S3 to be deenergized so that the pallet is released by the pallet gripping device, the spring 530 moving the arms 502, 504 to pallet releasing position. Switch M6 now opens and the solenoid S6 is deenergized, thereby causing the pallet gripping device to be returned to the transfer station. As the carriage 306 of the transfer mechanism returns to the position shown in Fig. 9, a projection 680, formed on the web 308 of the carriage, Fig. 21, strikes the plunger 681 of a microswitch M9 thereby causing this switch to be opened, against the resistance of a closing spring associated therewith. As a result of the opening of the switch M9 the solenoid S5 is deenergized and the valve plunger 570, Fig. 22, is returned to the position shown in that figure by spring 574. The piston 606 will now be moved upwardly, Fig. 22, to close the gate members 590, 592 by the pressure of the fluid acting on the lower side of this piston, operating fluid on the other side thereof exhausting through the duct 612, ports 576, 580, to the exhaust line 558. As these gate members commence their closing movements, switch M7 will be opened and, at the completion of the closing movements of the gate members, the arm 598, Fig. 3, will strike a roller 682 on the plunger of a microswitch M10 and close this switch. The closing of the switch M10 results in the energizing of the coil 686 of a solenoid S8, having an armature 688, Fig. 3, which, as will presently be explained, initiates an automatic cycle of operation of the trimming machine 40.

Referring to Figs. 1 and 3, there is associated with the spider 82 a rack 690 (corresponding to the rack 252 of the aforementioned patent) which, when the automatic operating cycle of the heel trimming machine is initiated, moves away from a roller 692 mounted on a pivoted arm 694, Fig. 3, and permits a microswitch M11 to open. At the same time, certain electrical circuits are transferred in a manner to be explained more fully below. At the conclusion of the automatic operating cycle of the heel trimming machine, during which the heel H of the shoe S on the pallet 34, which is clamped to the work holder 58, is trimmed by the cutter 60, the switch M11 is again closed and the mentioned circuits are restored. This causes the coil of the solenoid S5 to be energized thereby effecting a second opening of the gate members 590, 592. When these gate members have reached open position, switch M7 is closed, as before, and the coil of solenoid S6 is again energized, thereby causing the carriage 306 to move again to the broken-line position shown in Fig. 1. As the movement of the carriage 306 to this position is terminated, switch M8 is closed and solenoid S3 is energized so that the pallet is again gripped by the arms 502, 504. When the pallet has thus been gripped, the switch M6 is closed and this closing of the switch M6, through suitable relays to be described below, deenergizes the solenoid S7. The clamping plunger 94 will now be elevated by the spring 116, Fig. 18, and as this plunger reaches its uppermost position, a collar 696 strikes a roller 698, Figs. 3 and 5, carried by the operating plunger of a microswitch M12 and closes this switch. Upon the closing of the switch M12, solenoid S6 is deenergized and the carriage 306, together with the pallet 34 and shoe S, are returned to the position shown in Fig. 9. Switch M9 will now be opened and solenoid S5 deenergized, whereupon the gate members 590, 592 again move to closed position and cause switch M10 to be closed.

Referring to Fig. 16, there is secured to one of the rails 32 of the runway in a location beyond the transfer station, see Fig. 5, an upright member 700 to which there is supported a microswitch M5 having a plunger 702. Pivotally mounted on the member 700 is an arm 704 having a downturned edge 706 which is adapted to be engaged by the wheel 134 of a pallet in this location along the runway. Unless thus engaged by the wheel of a pallet, this arm remains in the position in which it is shown in Fig. 16 and with the switch M5 open. Accordingly, if no pile-up condition exists on the runway, beyond the heel trimming machine, which would hold a pallet in a position to elevate the arm 704, the switch M5 will be open and the closing of the switch M10 will deenergize the solenoid S3. When this occurs, the valve member 546 will be returned, by spring 574, to the position shown in Fig. 22, and the arms 502, 504 of the pallet gripping device will be moved to pallet releasing position by the spring 530. Associated with the pallet gripping device is a finger 710 which, when the arms 502, 504 are in gripping position, see Fig. 9, engages the drive finger 162. Upon the release of the pallet gripping device, in the above manner, this finger will be elevated, thereby permitting the drive finger 162 to move upwardly into a position to be engaged by a driving lug 38 of the belt 36. Thus the pallet which has just been released will travel out of the transfer station. Referring to Fig. 14, there is pivotally mounted on a portion 712 of the bracket 240 an arm 714 provided with a cam surface 716. In engagement with another surface 718 formed on this arm is the plunger 720 of a microswitch M4. As the pallet travels out of the transfer station, the stud 234, on which one of the pallet wheels is mounted, operates the arm 714 momentarily to close and then to open the switch M4. As this switch closes, solenoid S1, previously referred to, is energized and the bar 170 is retracted thereby releasing the next succeeding pallet and causing it to travel into the transfer station, thus completing a cycle of operations of the transfer mechanism.

As is fully explained in the aforementioned patent, the heel trimming machine is provided with a plurality of fluid pressure operated pistons the actions of which are controlled by an electrical system including a plurality of solenoids, microswitches, etc., see especially Figs. 8 and 9 of the mentioned patent. Also, a complete operating cycle of the heel trimming machine is described in detail beginning at line 60 of column 12 and running through line 52 of column 15 of the specification of that patent. In order to adapt the heel trimming machine for use with the transfer mechanism described above, the electrical control system of the heel trimming machine, see Fig. 24 of the drawings of this application, has been suitably combined with the electrically controlled system of the transfer mechanism, see Fig. 23 of the drawings of this application, and an additional mechanical control linkage has been added, this control linkage being shown in Figs. 6 and 7 of this application. It will be understood by reference to the mentioned patent, that when the heel trimming machine therein disclosed is at rest, the table 56 is moved outwardly away from the heel trimming cutter, the frame casting 54 is moved upwardly and the base casting 52 is tilted in a counterclockwise direction, as viewed in Fig. 5 of the drawings of this application, as the result of a biasing of the jet nozzles of the three fluid jet relays 66, 68 and 70 (corresponding to the jet relays (400), (402) and (404) of the patented machine, see Fig. 8 of the patent) by means of solenoids herein identified, respectively, as S10, S11 and S12, see Fig. 24 and also Fig. 3 (corresponding, respectively to the solenoids 600, 610 and 620 of the patented machine, see Fig. 9 thereof). Referring to Fig. 3 of this application, the solenoid S12 associated with the jet relay 70 which controls the swinging movements of the base casting 52, is provided with a coil 800 and an armature 802. This armature is connected to a lever 804, pivotally mounted on a portion of the frame of the heel trimming machine by means of a stud 806, Figs. 6 and 7, by means of two coil springs 808, 808, Fig. 7, and threaded into the other arm of this lever is an abutment screw 810. The feeler 64, Fig. 1, which operates the jet relay 70, has associated therewith a downwardly extending arm 812, coresponding to the arm (528) of the patented machine, see Fig. 4 thereof, and the abutment screw 810 is adapted to engage this arm to apply a biasing force on the nozzle of the jet relay 70 when the lever 804 is swung in a clockwise direction, Fig. 6, as a result of the energizing of the coil 800 of the solenoid S12. Also pivotally mounted on a stud 818 on the frame of the heel trimming machine is a second lever 820 one arm of which is connected by means of a link 822 to a portion of the base casting 52, see Figs. 1, 3 and 5. Threaded into the other arm of the lever 820 is an adjustable abutment screw, provided with a locknut 825, which is adapted to engage an abutment surface 826 formed on the previously mentioned lever 804, Fig. 6. With this arrangement, when the solenoid S12 is energized, the nozzle of the jet relay 70 will be biased in a direction to cause the base casting 52 to swing toward the level position in which it is shown in Fig. 5, and when the base casting reaches this level position, the screw 824 will engage the surface 826 and swing the lever 804 in a direction opposite to that in which it was urged by the arm 802 and springs 808, 808, thereby moving the jet nozzle of the jet relay 70 to a neutral position in which further swinging movement of the base casting 52 is arrested and the base casting held in a level position.

It will be appreciated that the base casting 52, and hence the work holder 58 of the heel trimming machine must be in a level position when a pallet 34 with a shoe S thereon is transferred from the runway 30 and placed on the work holder and also when the pallet 34 and shoe thereon are subsequently re-engaged by the pallet gripping device and removed from the work holder by the transfer mechanism. It is equally important that the table 56 be moved outwardly to withdraw the shoe from the cutter 60 and that the frame casting 54 be moved downwardly before the aforementioned actions of the transfer mechanism are effected. Thus there are interposed in the electrical control system for the transfer mechanism two microswitches M13 and M14, see Fig. 23. Referring to Fig. 5, there is secured to the base casting a bracket 830 on which the aforementioned microswitch M13 is mounted and this switch is provided with an operating arm 832 carrying a roller 834. Fastened to the table 56 is a downwardly extending L-shaped arm 836. When the table 56 is moved outwardly and the frame casting 54 is moved downwardly, the arm 836 will engage the roller 834 and move the switch M13 into the position (B—B) in which it is shown in Fig. 23. As shown in Fig. 2 of the drawings, there is secured to the frame member 50 a bracket 840 on which the switch M14 is mounted and this switch has an operating plunger 842 carrying a roller 844. Fastened to the base casting 52 is an arm 846 having an inclined end portion 848 which, when the base casting is in a level position, will engage the roller 844 and move the switch M14 to the position (D—D) in which it is shown in Fig. 23. As will be explained in more detail below, the switches M13 and M14 must be in the aforementioned positions in order to condition the electrical control system for effecting the mentioned actions of the transfer mechanism in response to another control switch or switches.

Figure 24:
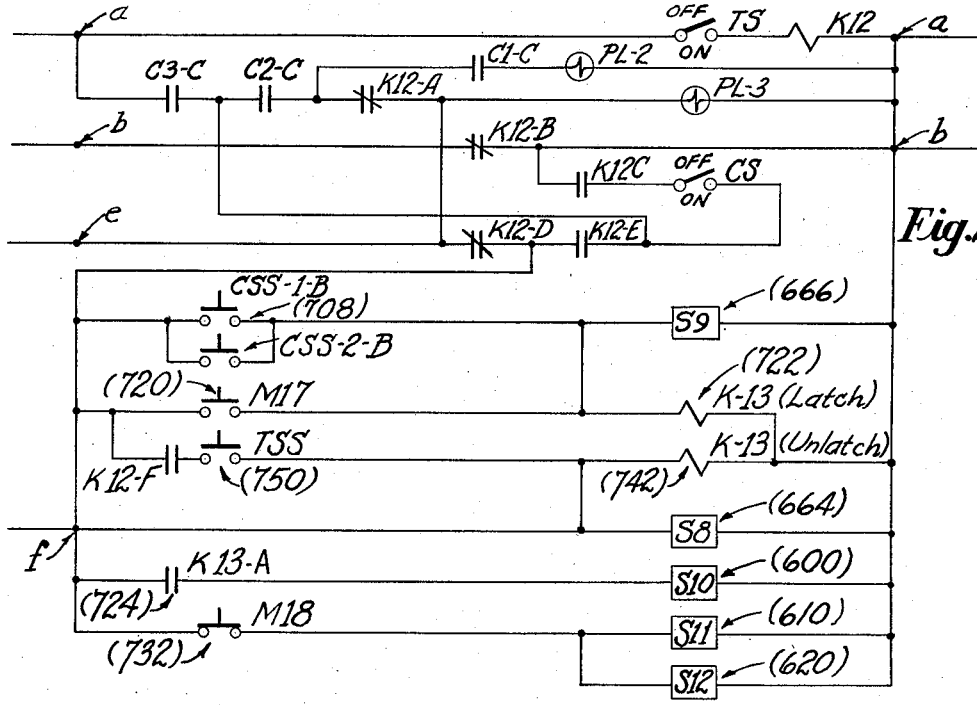

Referring particularly to Figs. 23 and 24 of the drawings, the former illustrates diagrammatically and by means of accepted electrical symbols, which should be readily understood, that portion of the electrical system which is associated with the work handling apparatus and the transfer mechanism, while the latter illustrates, in the same manner, that portion of the electrical system which is associated more particularly with the heel trimming machine, this portion of the electrical system being substantially similar to the electrical system which is illustrated in Fig. 9 of the above-mentioned patent. These two portions of the electrical system are interconnected by means of suitable leads (not shown) so that the circuits between the points a—a in Fig. 24 are in a cross circuit 1 of Fig. 23; the circuit between points b—b in Fig. 24 is interposed between points c and d of a cross circuit 9 in Fig. 23; point e in Fig. 24 is connected to the circuit 10 in Fig. 23; and point f in Fig. 24 is connected to point g in Fig. 23. For the most part, the microswitches and solenoids which are diagrammatically illustrated in Fig. 24 correspond to similar elements in the electrical system of the machine disclosed in the mentioned patent. Thus, solenoid S8, referred to above, see Fig. 3, corresponds to the coil (664) and armature (668) of the solenoid (662) of the patented machine, while a solenoid S9, to be referred to below, corresponds to the coil (666) and armature (670) of the solenoid (662), see Fig. 8 of the patent. Also, solenoids S10, S11 and S12 correspond respectively to solenoids (600), (610) and (620) of the patented machine, while microswitches M17, M18 correspond to microswitches (720), (732) of the patented machine; push button switches CSS–1–B and CSS–2–B, and TSS, Fig. 24, correspond, respectively, to manually operated switches (708) and (750) of the patented machine, see Fig. 8. In addition to the microswitches and solenoids which have just been referred to, each of these two portions of the electrical system includes a number of relays the coils of which are identified as K1 to K12, K13 (latch), K13 (unlatch), each relay having several contacts located in the system in the places indicated on these diagrams, some of these contacts being normally closed and others normally opened when the relay coil is deenergized. These relays are of conventional construction and their respective functions, as well as the functions of the several microswitches and solenoids which have not already been explained above, will be apparent from the following outline of the operation of the electrical sequence.

Refering particularly to Fig. 23, when the several motors associated with the heel trimming machine are started, in a manner to be explained below, three relay contacts C1–C, C2–C and C3–C will be closed and that part of the electrical system associated with the transfer mechanism will be energized, this condition being indicated by the glowing of a pilot light PL–1. A relay contact K40–F will also be closed by virtue of the energization of its relay coil which is located in a remotely positioned control circuit, not shown. Therefore, the solenoid S1 will be energized to retract the holdback mechanism, i.e., the bar 170, Fig. 12, and this will permit the initial pallet on the runway to pass through the holdback station into the transfer station. As this pallet moves out of the holdback station, the switch M1 will be momentarily closed, thereby energizing relay K1 which is thereafter electrically maintained through closed contact K1–A and switch M4 which, at this time, is closed. Contact K1–B now opens and contact K1–C closes. Solenoid S4 is energized through K1–A and switch M4 thereby locking the slide 406 and the switch M8, see Fig. 21, in the positions to which they have just been moved by the action of the heel H of the shoe S on the feeler arm 206. The opening of the contact K1–B deenergizes the solenoid S1 so that the holdback mechanism is reset to detain the next succeeding pallet in the holdback station. The closing of the contact K1–C energizes cross circuits 10, 11 and 12 of this portion of the electrical system.

As the pallet enters the transfer station, switch M2 is closed, thereby energizing solenoid S2 and causing the pallet stopping and alining mechanism, see members 246 and 252, Fig. 15, to operate. As the pallet alining arm 246 strikes home, switch M3 is closed and relay K2 and solenoid S3 are energized. Relay contacts K2–A and K2–B now close so that relay K2 is electrically maintained through contact K2–A. The energizing of the solenoid S3 causes the pallet gripping device to grip the pallet, see Figs. 9 and 22, and when this occurs the switch M6 is closed. The closing of this switch energizes solenoid K3 so that relay contacts K3–A and K3–B close, while relay contact K3–C opens. Relay K5 is energized, through contact K3–A and relay contact K5–A closes, while solenoid S5 is energized through relay contact K3–A which electrically maintains relay K5. As a result of the energization of solenoid S5, valve member 570, Fig. 22 is operated to cause the gate members 590, 592, see Fig. 3, to be opened, see broken line position, Fig. 3, thus permitting the switch M10 to open and moving the switch M7 to closed position. Solenoid S6 is now energized and the valve member 624, Fig. 22, is moved to a position to cause the piston 374 to move to the left so that the pallet gripping device and the carriage 306 are moved to the right, Fig. 21. The switch M9 closes as the carriage moves away from the position in which it is shown in Fig. 21 and the switch M2 opens when the pallet leaves the transfer station. Relay K5 and solenoid S5 are maintained through contact K5–A and switch M9, while the solenoid S2 is deenergized as the switch M2 opens. The pallet alining arm 246 is now retracted and this opens the switch M3.

When the carriage 306 completes the aforementioned movement and the pallet arrives in position on the work holder 58, as indicated in broken lines in Fig. 1, the switch M8, see Fig. 21, is closed. The switch M15, Fig. 8, of course, was previously closed when the pallet entered the transfer station and therefore the relay K4 is energized and contacts K4–A and K4–B are closed. Relay K6 and solenoid S7 are now energized through contacts K8–F, K4–A, K2–B and K7–B; contact K6–C opens, while contact K6–A and K6–B close, coil K6 being electrically maintained through K8–F and K6–A. Solenoid S7 now operates the valve 644, Fig. 22, so that the piston 180 actuates the clamping mechanism, i.e., plunger 94, Fig. 18, to clamp the shoe S and the pallet on the work holder 58 of the heel trimming machine. When the pressure of the fluid in the cylinder 110 builds up to a predetermined point, the switch PS1 will be opened, Fig. 22, thus deenergizing the relay coil K2 and the solenoid S3. Contacts K2–A and K2–B now return to open positions and the pallet gripping device releases the pallet as solenoid S3 is deenergized. Switch M6 now returns to open position and deenergizes relay K3 so that contacts K3–A and K3–B open while contact K3–C closes, the opening of contact K3–B deenergizing solenoid S6. This causes the pallet gripping device and carriage 306 to be returned to the position shown in Fig. 1 and the switch M9 to be again opened. The opening of this switch deenergizes the relay K5 and the solenoid S5 thus causing the gate members 590, 592 to be closed, switch M7 to be opened, and switch M10 to be closed. As the result of the closing of the switch M10, relay K7 is energized and maintained electrically through contact K7–A. Solenoid S8 is now energized and contact K7–B is opened.

As has been explained above, the solenoid S8 corresponds to the coil (644) and armature (668) of the solenoid (662) of the patented machine, see Fig. 9 of the patent. It will, therefore, be apparent that the energizing of the solenoid S8 will initiate a cycle of operations of the heel trimming machine. Inasmuch as that portion of the electrical system which is shown in the lower part of Fig. 24 is fully equivalent to that provided in the patented machine and shown diagrammatically in Fig. 8 of the drawings of the patent, it will be unnecessary to set forth here a detailed description of the automatic operating cycle of the heel trimming machine. It may be noted, however, that relay K13 (latch) and relay K13 (unlatch) correspond, respectively, to coils (722) and (742) of the patented machine, see Fig. 9 of the patent, while relay contact K13–A corresponds to switch 724 of the patented machine. During this trimming cycle, the switches M13 and M14, see Fig. 1, transfer from the positions marked B—B and D—D to those marked A—A and C—C, Fig. 23, as the members 836 and 846 move away from the rollers 834 and 844, Fig. 1. This energizes the relay K11 so that contacts K11–A and K11–B close, while contact K11–C opens. K11–A maintains the relay K11, while the opening of contact K11–C deenergizes the solenoid S8. At the beginning of the trimming cycle the switch M11, Fig. 2, opens, while at the completion of the trimming cycle the switch M17 is closed, thereby energizing the solenoid S9 which, as pointed out above, corresponds to the coil 666 and armature 670 of the solenoid 662 of the patented machine, see Figs. 8 and 9 of the patent. The shoe holder will now return to its original position. The closing of the switch M17 also energizes a relay K13 (latch), corresponding to the coil 722 of the patented machine, so that solenoids S10, S11 and S12 are energized to bring the work holder to its original and level position. When this has been done, switch M11 will be closed and switches M13 and M14 will be returned to the positions B—B and D—D, Fig. 23. A relay K8 (herein illustrated as provided with two coils) is now energized so that contact K8–F opens while contacts K8–A, K8–B, K8–C, K8–D and K8–E close, the closing of contact K8–A electrically maintaining this relation. As a result of the closing of contact K8–B, relay K5 and solenoid S5 are energized, thus causing the gate members to open and the switch M7 to be closed. This energizes the solenoid S6 through relay contact K8–D with the result that the transfer mechanism and the carriage 306 again move down to the broken-line position shown in Fig. 1, thus closing the switch M8, and also the switch M15 provided there is a pallet on the work holder to be gripped by the pallet gripping device.

The closing of switches M8 and M15 energizes the relay K4 and the contact K4–A and K4–B close. The closing of contact K4–B energizes relay K2 and solenoid S3 through contact K8–C, contacts K2–A and K2–B now close. As a result of the energizing of the solenoid S3 the pallet gripping device is again operated to grip the pallet, and after this has been done the switch M6 is closed to energize the relay K3. Contacts K3–A, K3–B close, while contact K3–C opens. Relay K6 and solenoid S7 are now deenergized so that the piston 108, Fig. 22, descends, thus retracting the shoe clamp plunger 94, Fig. 18, and closing the switch M12, Fig. 5. The relay K9 is energized through contact K8–E and is electrically maintained through contact K9–A, contacts K9–B and K9–C now opening, while contact K9–D closes. Solenoid S6 is deenergized upon the opening of contact K9–B and the pallet gripping device and carriage 306 are now operated to return the pallet to the loading station. As this return movement is completed, the switch M9 is opened, thus deenergizing relay K5 and solenoid S5. The gate members 590, 592 are now closed as the result of the deenergizing of solenoid S5, and as these gate members close, switch M10 is closed to energize the relay K10. Relay contact K10–A now opens and, if no pile-up condition exists on the runway, beyond the transfer station, the switch M5 will also be opened and the relay K2 and solenoid S3 will be deenergized. The pallet gripping device will now release the pallet which will immediately travel out of the transfer station. As the pallet thus moves out of the transfer station it will momentarily open switch M4, thus deenergizing relay K1 and solenoid S4 so that contact K1–A and K1–C are opened, while contact K1–B is closed. When the contact K1–B closes the solenoid S1 will be energized and the holdback mechanism retracted to permit the next succeeding pallet to enter the transfer station. The opening of relay contact K1–C deenergizes relays K7, K8, K9 and K10 and the opening of switch M6, which occurred when the pallet was released, deenergized the relay K3. Thus the transfer mechanism control circuits are reset so that they can again function in the manner described above.

As suggested above, the pile-up indicator safety switch M5 prevents the release of the pallet grippers when a pile-up exists on the runway beyond the transfer station. Thus the pallet cannot move out of the transfer station until this condition has been cleared and M5 returned to open position. The table position indicator switches M13 and M14, which have been mentioned above, prevent the ejection of the finished shoe from the work holder of the trimming machine until the work holder has been returned to its normal and level position. This is to make certain that the work holder is in the correct starting position for trimming the heel on the shoe carried by the next succeeding pallet.

Figure 25:
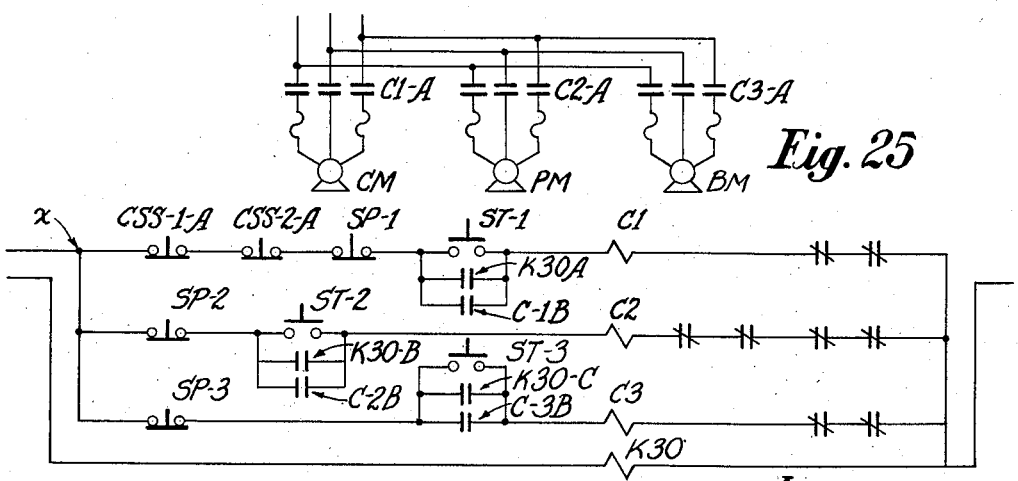

Fig. 25 of the drawings illustrates diagrammatically that portion of the electrical system which is associated particularly with the motors of the heel trimming machine, i.e., a cutter drive motor CM corresponding to the motor 34 of the patented machine, a pump motor PM, corresponding to the motor 432 of the patented machine, and a blower motor BM, not shown in the patent. This portion of the electrical system includes three relays C1, C2 and C3 each of which has three normally open contacts C1–A, C1–B and C1–C; C2–A, C2–B and C2–C; and C3–A, C3–B and C3–C, and a fourth relay K30 having normally open contacts K30–A, K30–B and K30–C. The locations and functions of these several relay contacts will be readily apparent from an inspection of Fig. 25, it being noted, however, that the contacts C1–C, C2–C and C3–C are located in that portion of the system shown in Fig. 23 and are repeated in that portion of the system shown in Fig. 24. The relay C1 is in the uppermost of the three cross circuits shown in Fig. 25, which circuit also contains four manually operated (push button type) switches CSS–1–A, CSS–2–A, SP–1 and ST–1, the first three of these switches being normally closed, while the fourth is normally open. Switches CSS–1–A and CSS–2–A, Fig. 25, are mechanically connected to switches CSS–1–B and CSS–2–B, Fig. 24, so that when either CSS–1–A or CSS–2–A are opened, switches CSS–1–B or CSS–2–B will be closed. Switches SP–2 and ST–2 in the middle cross circuit, and switches SP–3 and ST–3 in the lower cross circuit correspond to switches SP–1 and ST–1, as will be apparent. The relay K30 is in a separate circuit which is electrically connected to a remote control circuit, and point x, common to the three cross circuits mentioned above, is likewise electrically connected to this remote control circuit.

With the above arrangement, the three motors of the heel trimming machine may be started individually by closing switches ST–1 and ST–2 or ST–3 thereby energizing the relays C1, C2 and C3, which are electrically maintained by relay contacts C1–B, C2–B and C3–B, or these three motors may be started simultaneously as the result of the energizing of the relay K30 and the closing of contacts K30–A, K30–B and K30–C from the remote control circuit. In an emergency, all three of these motors may be stopped by the opening of a switch in the remote control circuit which, in effect, disconnects point x from that circuit. Also, the trimming cutter motor may be stopped by opening switch CSS–1–A or switch CSS–2–A. When this is done, the switch CSS–1–B or switch CSS–2–B will be colsed and solenoid S9 will be energized, thus causing the work holder 58 of the heel trimming machine to retract the shoe from the cutter and to return to its starting position.

In order to make it possible to operate the heel trimming machine independently of the transfer mechanism, that portion of the electrical system which is shown in Fig. 24 is provided with a relay K12 which is adapted to be energized by the closing of a manually operable switch TS, thus causing the contacts K12–A, K12–B and K12–D to be opened, and contact K12–C, K12–E and K12–F to be closed. This portion of the electrical system also includes a pilot light PL–2 which glows when the heel trimming motors are started and a pilot light PL–3 which glows when the aforementioned switch TS is closed. Since the pallet clamping mechanism is operated in response to the movement of the pallet gripping device and carriage to the broken-line position shown in Fig. 1, this portion of the electrical circuit is provided with a manually operable switch CS which may be closed to effect this clamping action independently of the transfer mechanism. When thus operating the heel trimming machine independently of the transfer mechanism, the operating cycle of the machine is initiated in response to the manual closing of the switch TSS, which, as noted above, corresponds to the starting switch 750 of the patented machine, see Fig. 9 of the patent.

Having thus described our invention, what we claim as new and desire to secure by Letters Patent of the United States is:

1. Mechanism for transferring a work carrying pallet from the transfer station of a work handling apparatus to the work holder of an automatic machine, comprising a transfer device having means for gripping the pallet and mounted for movement between a first position adjacent to the transfer station of the work handling apparatus and a second position adjacent to the work supporting holder, and operating mechanism arranged to be set into action by the arrival of a pallet at said transfer station for causing said transfer device in a series of sucessive operations to grip a pallet while in said first position, to move to said second position and deposit the pallet on said work holder, and to release the pallet and move to said first position, and responsive to the conclusion of an operating cycle of the machine for causing the transfer device to move again to said second position and grip the pallet, to return to said first position and deposit the pallet on said work handling apparatus, and finally to release the pallet to the action of said work handling apparatus.

2. Mechanism for transferring a work carrying pallet from a work handling apparatus to the work holder of an automatic machine having control means for initiating an operating cycle thereof, comprising a transfer device having means for gripping the pallet and mounted for movement between a first position adjacent to the work handling apparatus and a second position adjacent to the work supporting holder, and operating mechanism for causing said transfer device in a series of successive operations to grip a pallet while in said first position, to move to said second position and deposit the pallet on said work holder, to release the pallet and move to said first position, and to actuate said control means to initiate an operating cycle of the machine, and responsive to the conclusion of the operating cycle of the machine for causing said transfer device to move again to said second position and grip the pallet, to return to said first position and deposit the pallet on said work handling apparatus, and finally to release the pallet to the action of said work handling apparatus.

3. Mechanism for transferring a work carrying pallet from a work handling apparatus to the work holder of an automatic machine having control means for initiating an operating cycle thereof, comprising a transfer device having means for gripping the pallet and mounted for movement between a first position adjacent to the work handling apparatus and a second position adjacent to the work supporting holder, and operating mechanism for causing said transfer device in a series of successive operations to grip a pallet while in said first position, to move to said second position and deposit the pallet on the work holder, to release the pallet and move to said first position, and to actuate said control means to initiate an operating cycle of the machine.

4. Mechanism for transferring a work carrying pallet from the transfer station of a work handling apparatus to the work holder of an automatic machine having control means for initiating an operating cycle thereof, comprising a transfer device having means for gripping the pallet and mounted for movement between a first position adjacent to the transfer station of the work handling apparatus and a second position adjacent to the work holder, and operating mechanism arranged to be set into action by the arrival of a pallet at said transfer station for causing said transfer device in a series of successive operations to grip a pallet while in said first position, to move to said second position and deposit the pallet in a predetermined location on said work holder, to release the pallet and move to said first position, and to actuate said control means to initiate an operating cycle of the machine, and responsive to the conclusion of the operating cycle of the machine for causing said transfer device to move again to said second position and grip the pallet, to return to said first position and deposit the pallet on said work handling apparatus, and finally to release the pallet to the action of said work handling apparatus.

5. Mechanism for transferring a work carrying pallet from the transfer station of a work handling apparatus to the work holder of an automatic machine having control means for initiating an operating cycle thereof, comprising a transfer device having means for gripping the pallet and mounted for movement between a first position adjacent to the transfer station of the work handling apparatus and a second position adjacent to the work holder, and operating mechanism arranged to be set into action by the arrival of a pallet at said transfer station for causing said transfer device in a series of successive operations to grip a pallet while in said first position, to move to said second position and deposit the pallet in a predetermined location on said work holder, to release the pallet and move to said first position, and to actuate said control means to initiate an operating cycle of the machine.

6. Mechanism for transferring a pallet carrying a shoe on its last from a work handling apparatus to an automatic shoe machine having a work holder for supporting and feeding the shoe during an automatic cycle of operation of the machine and means for controlling the operation of the machine, comprising a transfer device mounted for movement between a first position adjacent to the work handling apparatus and a second position adjacent to the work holder and provided with means for gripping the pallet, operating mechanism for effecting movement of the transfer device and for actuating the gripping means, and means for controlling said operating mechanism to cause the transfer device in a seires of successive operations to grip a pallet while in said first position, to move to said second position and deposit the pallet on said work holder, and to release the pallet and move to said first position, and responsive to the conclusion of a cycle of operation of the machine for controlling said operating mechanism to cause said transfer device to move again to said second position and grip the pallet, to return to said first position and deposit the pallet on said work handling apparatus, and finally to release the pallet to the action of said work handling apparatus.

7. Mechanism for transferring a pallet carrying a shoe on its last from the transfer station of a work handling apparatus to an automatic shoe machine having a work holder for supporting and feeding the shoe during an automatic cycle of operation of the machine and means for controlling the operation of the machine, comprising a transfer device mounted for movement between a first position adjacent to the transfer station of the work handling apparatus and a second position adjacent to the work holder and provided with means for gripping the pallet, operating mechanism arranged to be set into action by the arrival of a pallet at said transfer station for effecting movement of the transfer device and for actuating the gripping means, to grip a pallet while in said first position, to move to said second position and deposit the pallet on said work holder, and to release the pallet and move to said first position, and means associated with the machine for controlling said operating mechanism upon conclusion of an automatic cycle of the machine to cause said transfer device to move again to said second position and grip the pallet, to return to said first position and deposit the pallet on said work handling apparatus, and finally to release the pallet to the action of said work handling apparatus.

8. Mechanism for transferring a pallet carrying a shoe on its last from a work handling apparatus to an automatic shoe machine having a work holder for supporting and feeding the shoe during an automatic cycle of operations of the machine and means for controlling the operation of the machine including control means for initiating an operating cycle thereof, comprising a transfer device mounted for movement between a first position adjacent to the work handling apparatus and a second position adjacent to the work holder and provided with means for gripping the pallet, operating mechanism for effecting movement of the transfer device and for actuating the gripping means, and means for controlling said operating mechanism to cause the transfer device in a series of successive operations to grip a pallet while in said first position, to move to said second position and deposit the pallet on said work holder, to release the pallet and move to said first position, and to actuate said control means to initiate an operating cycle of the machine, and responsive to the conclusion of an operating cycle of the machine for controlling said operating mechanism to cause said transfer device to move again to said second position and grip the pallet at the conclusion of said operating cycle, to return to said first position and deposit the pallet on said work handling apparatus, and finally to release the pallet to the action of said work handling apparatus.

9. Mechanism for transferring a pallet carrying a shoe on its last from a work handling apparatus to an automatic shoe machine having a work holder for supporting and feeding the shoe during an automatic cycle of operation of the machine and means for controlling the operation of the machine, comprising a transfer device mounted for movement between a first position adjacent to the work handling apparatus and a second position adjacent to the work holder and provided with means for gripping the pallet, operating mechanism for effecting movement of the transfer device and for actuating the gripping means, and means for controlling said operating mechanism to cause the transfer device in a series of successive operations to grip a pallet while in said first position, to move to said second position and deposit the pallet in a predetermined location on said work holder, and to release the pallet and move to said first position, and responsive to the conclusion of a cycle of operation of the machine for controlling said operating mechanism to cause said transfer device to move again to said second position and grip the pallet, to return to said first position and deposit the pallet on said work handling apparatus, and finally to release the pallet to the action of said work handling apparatus.

10. Mechanism for transferring a pallet carrying a shoe on its last from the transfer station of a work handling apparatus to an automatic shoe machine having a work holder for supporting and feeding a shoe during an automatic cycle of operation of the machine and means for controlling the operation of the machine including control means for initiating an operating cycle thereof, comprising a transfer device mounted for movement between a first position adjacent to the transfer station of the work handling apparatus and a second position adjacent to the work holder and provided with means for gripping the pallet, operating mechanism for effecting movement of the transfer device and for actuating the gripping means, and means responsive to the arrival of a pallet at said transfer station for controlling said operating mechanism to cause the transfer device in a series of successive operations to grip a pallet while in said first position, to move to said second position and deposit the pallet in a predetermined location on said work holder, to release the pallet and move to said first position, and to actuate said control means to initiate an operating cycle of the machine, and responsive to the conclusion of an operating cycle of the machine for controlling said operating mechanism to cause said transfer device to move again to said second position and grip the pallet, to return to said first position and deposit the pallet on said work handling apparatus, and finally to release the pallet to the action of said work handling apparatus.

11. Mechanism for transferring a pallet carrying a shoe on its last from a work handling apparatus to an automatic heel trimming machine having a work holder for supporting and feeding the shoe during an automatic cycle of operation of the machine and means for controlling the operation of the machine, comprising a transfer device mounted for movement between a first position adjacent to the work handling apparatus and a second position adjacent to the work holder and provided with means for gripping the pallet, operating mechanism for effecting movement of the transfer device and for actuating the gripping means, and means for controlling said operating mechanism to cause the transfer device in a series of successive operations to grip a pallet while in said first position, to move to said second position and deposit the pallet on said work holder, and to release the pallet and move to said first position, and responsive to the conclusion of a cycle of operation of the machine for controlling said operating mechanism to cause said transfer device to move again to said second position and grip the pallet, to return to said first position and deposit the pallet on said work handling apparatus, and finally to release the pallet to the action of said work handling apparatus.

12. Mechanism for transferring a pallet carrying a shoe on its last from the transfer station of a work handling apparatus to an automatic heel trimming machine having a work holder for supporting and feeding the shoe during an automatic cycle of operation of the machine, and means for controlling the operation of the machine, comprising a transfer device mounted for movement between a first position adjacent to the transfer station of the work handling apparatus and a second position adjacent to the work holder and provided with means for gripping the pallet, operating mechanism for effecting movement of the transfer device and for actuating the gripping means, and means responsive to the arrival of a pallet at said transfer station for controlling said operating mechanism to cause the transfer device in a series of successive operations to grip a pallet while in said first position, to move to said second position and deposit the pallet on said work holder, and to release the pallet and move to said first position, and responsive to the conclusion of a cycle of operation of the machine for controlling said operating mechanism to cause said transfer device to move again to said second position and grip the pallet, to return to said first position and deposit the pallet on said work handling apparatus, and finally to release the pallet to the action of said work handling apparatus.

13. Mechanism for transferring a pallet carrying a shoe on its last from a work handling apparatus to an automatic heel trimming machine having a work holder for supporting and feeding the shoe during an automatic cycle of operations of the machine and means for controlling the operation of the machine including control means for initiating an operating cycle thereof, comprising a transfer device mounted for movement between a first position adjacent to the work handling apparatus and a second position adjacent to the work holder and provided with means for gripping the pallet, operating mechanism for effecting movement of the transfer device and for actuating the gripping means, and means for controlling said operating mechanism to cause the transfer device in a series of successive operations to grip a pallet while in said first position, to move to said second position and deposit the pallet on said work holder to release the pallet and move to said first position, and to activate said control means to initiate an operating cycle of the machine, and responsive to the conclusion of an operating cycle of the machine for controlling said operating mechanism to cause said transfer device to move again to said second position and grip the pallet at the conclusion of said operating cycle, to return to said first position and deposit the pallet on said work handling apparatus, and finally to release the pallet to the action of said work handling apparatus.

14. Mechanism for transferring a pallet carrying a shoe on its last from a work handling apparatus to an automatic heel trimming machine having a work holder for supporting and feeding the shoe during an automatic cycle of operation of the machine, and means for controlling the operation of the machine, comprising a transfer device mounted for movement between a first position adjacent to the work handling apparatus and a second position adjacent to the work holder and provided with means for gripping the pallet, operating mechanism for effecting movement of the transfer device and for actuating the gripping means, and means for controlling said operating mechanism to cause the transfer device in a series of successive operations to grip a pallet while in said first position, to move to said second position and deposit the pallet in a predetermined location on said work holder, and to release the pallet and move to said first position, and responsive to the conclusion of a cycle of operation of the machine for controlling said operating mechanism to cause said transfer device to move again to said second position and grip the pallet, to return to said first position and deposit the pallet on said work handling apparatus, and finally to release the pallet to the action of said work handling apparatus.

15. Mechanism for transferring a pallet carrying a shoe on its last from the transfer station of a work handling apparatus to an automatic heel trimming machine having a work holder for supporting and feeding a shoe during an automatic cycle of operation of the machine and means for controlling the operation of the machine including control means for initiating an operating cycle thereof, comprising a transfer device mounted for movement between a first position adjacent to the transfer station of the work handling apparatus and a second position adjacent to the work holder, and provided with means for gripping the pallet, operating mechanism for effecting movement of the transfer device and for actuating the gripping means, and means responsive to the arrival of a pallet at said transfer station for controlling said operating mechanism to cause the transfer device in a series of successive operations to grip a pallet while in said first position, to move to said second position and deposit the pallet in a predetermined location on said work holder, to release the pallet and move to said first position, and to activate said control means to initiate an operating cycle of the heel trimming machine, and responsive to the conclusion of an operating cycle of the machine for controlling said operating mechanism to cause said transfer device to move again to said second position and grip the pallet at the conclusion of said operating cycle, to return to said first position and deposit the pallet on said work handling apparatus, and finally to release the pallet to the action of said work handling apparatus.

16. Mechanism for transferring a work carrying pallet from a runway along which pallets are propelled to the work holder of an automatic machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of the automatic machine for causing said transfer device to move again to said second position and grip the pallet, to return to said first position and deposit the pallet on said runway, and finally to release the pallet, an adjustable stop for limiting movement of said transfer device as it moves to said second position, and means for adjusting said stop to vary said second position of the transfer device relatively to said work holder.

17. Mechanism for transferring a work carrying pallet from a runway along which pallets are propelled to the work holder of an automatic machine, comprising a transfer device having means for gripping the pallet and mounted for movement between a first position adjacent to the runway and a second position adjacent to the work holder, operating mechanism for causing the transfer device in a series of successive operations to grip a pallet on said runway while in said first position, to move to said second position and deposit the pallet on said work holder, and to release the pallet and move to said first position, an adjustable stop for limiting movement of said transfer device as it moves to said second position, and means for adjusting said stop to vary said second position of the transfer device relatively to said work holder.

18. Mechanism for transferring a work carrying pallet from a runway along which pallets are propelled to the work holder of an automatic machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of the automatic machine for causing said transfer device to move again to said second position and grip the pallet, to return to said first position and deposit the pallet on said runway, and finally to release the pallet, an adjustable stop for limiting movement of said transfer device as it moves to said second position, and means including a member engageable by a portion of the work on the pallet as it is propelled along the runway for adjusting said stop to vary said second position of the transfer device relatively to said work holder.

19. Mechanism for transferring a work carrying pallet from a runway along which pallets are propelled to the work holder of an automatic machine, comprising a transfer device having means for gripping the pallet and mounted for movement between a first position adjacent to the runway and a second position adjacent to the work holder, operating mechanism for causing the transfer device in a series of successive operations to grip a pallet on said runway while in said first position, to move to said second position and deposit the pallet on said work holder, and to release the pallet and move to said first position, an adjustable stop for limiting movement of said transfer device as it moves to said second position, and means including a member engageable by a portion of the work on the pallet as it is propelled along the runway for adjusting said stop to vary said second position of the transfer device relatively to said work holder.

20. Mechanism for transferring a work carrying pallet from a runway along which pallets are propelled to the work holder of an automatic machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of the automatic machine for causing said transfer device to move again to said second position and grip the pallet, to return to said first position and deposit the pallet on said runway, and finally to release the pallet, an adjustable stop for limiting movement of said transfer device as it moves to said second position, and means including a member located adjacent to the runway and engageable by a portion of the work on the pallet as it is propelled along the runway for adjusting said stop to vary said second position of the transfer device relatively to said work holder.

21. Mechanism for transferring a work carrying pallet from a runway along which pallets are propelled to the work holder of an automatic machine, comprising a transfer device having means for gripping the pallet and mounted for movement between a first position adjacent to the runway and a second position adjacent to the work holder, operating mechanism for causing the transfer device in a series of successive operations to grip a pallet on said runway while in said first position, to move to said second position and deposit the pallet on said work holder, and to release the pallet and move to said first position, an adjustable stop for limiting movement of said transfer device as it moves to said second position, and means including a member located adjacent to the runway and engageable by a portion of the work on the pallet as it is propelled along the runway for adjusting said stop to vary said second position of the transfer device relatively to said work holder.

22. Mechanism for transferring a pallet carrying a shoe on its last from a runway along which pallets are propelled to an automatic shoe machine having a work holder for supporting and feeding a shoe during an automatic cycle of operation of the machine, and means for controlling the operation of the machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of operation of the machine for causing said transfer device to move again to said second position and grip the pallet, to return to said first position and deposit the pallet on said runway, and finally to release the pallet, an adjustable stop for limiting movement of said transfer device as it moves to said second position, and means for adjusting said stop to vary said second position of the transfer device relatively to said work holder.

23. Mechanism for transferring a pallet carrying a shoe on its last from a runway along which pallets are propelled to an automatic shoe machine having a work holder for supporting and feeding a shoe during an automatic cycle of operation of the machine and means for controlling the operation of the machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of operation of the machine for causing said transfer device to move again to said second position and grip the pallet, to return to said first position and deposit the pallet on said runway, and finally to release the pallet, an adjustable stop for limiting movement of said transfer device as it moves to said second position, and means including a member engageable by a portion of the shoe on the pallet as it is propelled along the runway for adjusting said stop to vary said second position of the transfer device relatively to said work holder.

24. Mechanism for transferring a pallet carrying a shoe on its last from a runway along which pallets are propelled to an automatic shoe machine having a work holder for supporting and feeding a shoe during an automatic cycle of operation of the machine, and means for controlling the operation of the machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of operation of the machine for causing said transfer device to move again to said second position and grip the pallet, to return to said first position and deposit the pallet on said runway, and finally to release the pallet, an adjustable stop for limiting movement of said transfer device as it moves to said second position, and means including a member located adjacent to the runway and engageable by a portion of the shoe on the pallet as it is propelled along the runway for adjusting said stop to vary the second position of the transfer device relatively to said work holder.

25. Mechanism for transferring a pallet carrying a shoe on its last from a runway along which pallets are propelled to an automatic heel trimming machine having a work holder for supporting and feeding a shoe during an automatic cycle of operation of the machine, and means for controlling the operation of the machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of operation of the machine for causing the transfer device to move again to said second position and grip the pallet, to return to said first position and deposit the pallet on said runway, and finally to release the pallet, an adjustable stop for limiting movement of said transfer device as it moves to said second position, and means for adjusting said stop to vary said second position of the transfer device relatively to said work holder.

26. Mechanism for transferring a pallet carrying a shoe on its last from a runway along which pallets are propelled to an automatic heel trimming machine having a work holder for supporting and feeding a shoe during an automatic cycle of operation of the machine, and means for controlling the operation of the machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of operation of the machine for causing said transfer device to move again to said second position and grip the pallet, to return to said first position and deposit the pallet on said runway, and finally to release the pallet, an adjustable stop for limiting movement of said transfer device as it moves to said second position, and means including a member engageable by a portion of the heel of the shoe on the pallet as it is propelled along the runway for adjusting said stop to vary said second position of the transfer device relatively to said work holder.

27. Mechanism for transferring a pallet carrying a shoe on its last from a runway along which pallets are propelled to an automatic heel trimming machine having a work holder for supporting and feeding a shoe during an automatic cycle of operation of the machine, and means for controlling the operation of the machine, comprising a transfer device having means for gripping the pallet and mounted for movement between a first position adjacent to said runway and a second position adjacent to the work holder, operating mechanism for causing the transfer device in a series of successive operations to grip a pallet on said runway while in said first position, to move to said second position and deposit the pallet on said work holder, and to release the pallet and move to said first position, and responsive to the conclusion of a cycle of operation of the machine for causing said transfer device to move again to said second position and grip the pallet, to return to said first position and deposit the pallet on said runway, and finally to release the pallet, an adjustable stop for limiting movement of said transfer device as it moves to said second position, and means including a member located adjacent to the runway and engageable by a portion of the heel of the shoe on the pallet as it is propelled along the runway for adjusting said stop to vary said second position of the transfer device relatively to said work holder.

28. Mechanism for transferring a work carrying pallet from a work handling apparatus to an automatic machine having a work holder and means for clamping a work carrying pallet on the holder, comprising a transfer device having means for gripping a pallet and mounted for movement from a first position adjacent to the work handling apparatus to a second position adjacent to the work holder, and operating mechanism for causing the transfer device to grip a pallet while in said first position, to move to said second position, deposit the pallet on said work holder and cause the clamping means to clamp the pallet on the holder, and to release the pallet and move to said first position, and responsive to the conclusion of a cycle of the automatic machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

29. Mechanism for transferring a work carrying pallet from the transfer station of a work handling apparatus to an automatic machine having a work holder and means for clamping a work carrying pallet on the holder, comprising a transfer device having means for gripping a pallet and mounted for movement from a first position adjacent to the transfer station of the work handling apparatus to a second position adjacent to the work holder, and operating mechanism arranged to bet set into action by the arrival of a pallet at said transfer station for causing the transfer device to grip a pallet while in said first position, to move to said second position, deposit the pallet on said work holder and cause the clamping means to clamp the pallet on the work holder, and to release the pallet and move to said first position, and responsive to the conclusion of a cycle of the automatic machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

30. Mechanism for transferring a work carrying pallet from a work handling apparatus to an automatic machine having control means for initiating an operating cycle thereof, a work holder and means for clamping a work carrying pallet on the holder, comprising a transfer device having means for gripping a pallet and mounted for movement from a first position adjacent to the work handling apparatus to a second position adjacent to the work holder, and operating mechanism for causing the transfer device to grip a pallet while in said first position, to move to said second position, deposit the pallet on said work holder and cause the clamping means to clamp the pallet on the work holder, to release the pallet and move to said first position, and to actuate said control means to initiate an operating cycle of the machine, and responsive to the conclusion of an operating cycle of the machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

31. Mechanism for transferring a work carrying pallet from a work handling apparatus to an automatic machine having control means for initiating an operating cycle thereof, a work holder and means for clamping a work carrying pallet on the holder, comprising a transfer device having means for gripping a pallet and mounted for movement from a first position adjacent to the work handling apparatus to a second position adjacent to the work holder, and operating mechanism for causing the transfer device to grip a pallet while in said first position, to move to said second position, deposit the pallet on said work holder and cause the clamping means to clamp the pallet on the work holder, to release the pallet and move to said first position, and to actuate said control means to initiate an operating cycle of the machine.

32. Mechanism for transferring a work carrying pallet from the transfer station of a work handling apparatus to an automatic machine having control means for initiating an operating cycle thereof, a work holder and means for clamping a work carrying pallet on the holder, comprising a transfer device having means for gripping a pallet and mounted for movement from a first position adjacent to the transfer station of the work handling apparatus to a second position adjacent to the work holder, and operating mechanism arranged to be set into action by the arrival of a pallet at said transfer station for causing the transfer device to grip a pallet while in said first position, to move to said second position, deposit the pallet on said work holder in a predetermined location and cause the clamping means to clamp the pallet on the work holder, to release the pallet and move to said first position, and to actuate said control means to initiate an operating cycle of the machine.

33. Mechanism for transferring a work carrying pallet from a work handling apparatus to an automatic machine having a work holder and means for clamping a work carrying pallet on the holder, comprising a transfer device having means for gripping a pallet and mounted for movement from a first position adjacent to the work handling apparatus to a second position adjacent to the work holder, and operating mechanism for causing the transfer device to grip a pallet while in said first position, to move to said second position, deposit the pallet on said work holder in a predetermined location and cause the clamping means to clamp the pallet on the work holder, and to release the pallet and move to said first position, and responsive to the conclusion of a cycle of the automatic machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

34. Mechanism for transferring a work carrying pallet from the transfer station of a work handling apparatus to an automatic machine having control means for initiating an operating cycle thereof, a work holder and means for clamping a work carrying pallet on the holder, comprising a transfer device having means for gripping a pallet and mounted for movement from a first position adjacent to the transfer station of the work handling apparatus to a second position adjacent to the work holder, and operating mechanism arranged to be set into action by the arrival of a pallet at said transfer station for causing the transfer device to grip a pallet while in said first position, to move to said second position, deposit the pallet on said work holder in a predetermined location and cause the clamping means to clamp the pallet on the work holder, to release the pallet and move to said first position, and to actuate said control means to initiate an operating cycle of the machine, and responsive to the conclusion of an operating cycle of the machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

35. The mechanism for transferring a shoe carrying pallet from a work handling apparatus to an automatic shoe machine having a work holder and means for clamping a shoe carrying pallet on the holder, comprising a transfer device having means for gripping a pallet and mounted for movement from a first position adjacent to the work handling apparatus to a second position adjacent to the work holder, and operating mechanism for causing the transfer device to grip a pallet while in said first position, to move to said second position, deposit the pallet on said work holder and cause the clamping means to clamp the pallet on the work holder, and to release the pallet and move to said first position, and responsive to the conclusion of a cycle of the automatic machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

36. The mechanism for transferring a shoe carrying pallet from the transfer station of a work handling apparatus to an automatic shoe machine having a work holder and means for clamping a shoe carrying pallet on the holder, comprising a transfer device having means for gripping a pallet and mounted for movement from a first position adjacent to the transfer station of the work handling apparatus to a second poistion adjacent to the work holder, and operating mechanism arranged to be set into action by the arrival of a pallet at said transfer station for causing the transfer device to grip a pallet while in said first position, to move to said second position, deposit the pallet on said work holder and cause the clamping means to clamp the pallet on the work holder, and to release the pallet and move to said first position, and responsive to the conclusion of a cycle of the automatic machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

37. The mechanism for transferring a shoe carrying pallet from a work handling apparatus to an automatic shoe machine having control means for initiating an operating cycle thereof, a work holder and means for clamping a shoe carrying pallet on the holder, comprising a transfer device having means for gripping a pallet and mounted for movement from a first position adjacent to the work handling apparatus to a second position adjacent to the work holder, and operating mechanism for causing the transfer device to grip a pallet while in said first position, to move to said second position, deposit the pallet on said work holder and cause the clamping means to clamp the pallet on the work holder, to release the pallet and move to said first position, and to actuate said control means to initiate an operating cycle of the machine, and responsive to the conclusion of an operating cycle of the machine for causing said transfer device to move again to said second position, grip the pallet and cause the clamping means to unclamp a pallet from the work holder, to return to said first position and deposit the pallet on said work handling apparatus, and finally to release the pallet to the action of said work handling apparatus.

38. The mechanism for transferring a shoe carrying pallet from a work handling apparatus to an automatic shoe machine having a work holder and means for clamping a shoe carrying pallet on the holder, comprising a transfer device having means for gripping a pallet and mounted for movement from a first position adjacent to the work handling apparatus to a second position adjacent to the work holder, and operating mechanism for causing the transfer device to grip a pallet while in said first position, to move to said second position, deposit the pallet on said work holder in a predetermined location and cause the clamping means to clamp the pallet on the work holder, and to release the pallet and move to said first position, and responsive to the conclusion of a cycle of the automatic machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

39. The mechanism for transferring a shoe carrying pallet from the transfer station of a work handling apparatus to an automatic shoe machine having control means for initiating an operating cycle thereof, a work holder and means for clamping a shoe carrying pallet on the holder, comprising a transfer device having means for gripping a pallet and mounted for movement from a first position adjacent to the transfer station of the work handling apparatus to a second position adjacent to the work holder, and operating mechanism arranged to be set into action by the arrival of a pallet at said transfer station for causing the transfer device to grip a pallet while in said first position, to move to said second position, deposit the pallet on said work holder in a predetermined location and to cause the clamping means to clamp the pallet on the work holder, to release the pallet and move to said first position, and to actuate said control means to initiate an operating cycle of the machine, and responsive to the conclusion of an automatic cycle of the machine for causing said transfer device to move again to said second position, grip the pallet and cause the clamping means to unclamp the pallet from the work holder, to return to said first position and deposit the pallet on said work handling apparatus, and finally to release the pallet to the action of said work handling apparatus.

40. Mechanism for transferring a work carrying pallet from the transfer station of a work handling apparatus to the work holder of an automatic machine having a base member for supporting the work and the pallet, comprising a transfer device including a carriage mounted for movement from a first position adjacent to the transfer station of said work handling apparatus to a second position adjacent to said work holder, pallet gripping means associated with said carriage and mounted for movement relatively thereto to deposit a work carrying pallet on the base member of the work holder when said carriage is in said second position, operating mechanisms for effecting movement of said carriage and said pallet gripping means and for actuating said pallet gripping means, and means for controlling the operating mechanisms arranged to be set into action by the arrival of a pallet at said transfer station and adapted to cause said transfer device in a series of successive operations to grip a pallet while in said first position, to move to said second position and deposit the pallet on said work holder, and to release the pallet and move to said first position, and responsive to the conclusion of a cycle of the automatic machine for causing said transfer device to move again to said second position and grip the pallet, to return to said first position and deposit the pallet on said work handling apparatus, and finally to release the pallet to the action of said work handling apparatus.

41. Mechanism for transferring a work carrying pallet from a work handling apparatus to the work holder of an automatic machine having control means for initiating an operating cycle thereof and a base member for supporting the work and the pallet, comprising a transfer device including a carriage mounted for movement from a first position adjacent to said work handling apparatus to a second position adjacent to said work holder, pallet gripping means associated with said carriage and mounted for movement relatively thereto to deposit a work carrying pallet on the base member of the work holder when said carriage is in said second position, operating mechanisms for effecting movement of said carriage and said pallet gripping means and for actuating said pallet gripping means, and means for controlling said operating mechanisms to cause said transfer device in a series of successive operations to grip a pallet while in said first position, to move to said second position and deposit the pallet on said work holder, to release the pallet and move to said first position, and to actuate said control means to initiate an operating cycle of the machine, and responsive to the conclusion of an operating cycle of the machine for controlling said operating mechanisms to cause said transfer device to move again to said second position and grip the pallet at the conclusion of said operating cycle, to return to said first position and deposit the pallet on said work handling apparatus, and finally to release the pallet to the action of said work handling apparatus.

42. Mechanism for transferring a work carrying pallet from the transfer station of a work handling apparatus to the work holder of an automatic machine having control means for initiating an operating cycle thereof and a base member for supporting the work and the pallet, comprising a transfer device including a carriage mounted for movement from a first position adjacent to the transfer station of said work handling apparatus to a second position adjacent to said work holder, pallet gripping means associated with said carriage and mounted for movement relatively thereto to deposit a work carrying pallet on the base member of the work holder when said carriage is in said second position, operating mechanisms for effecting movement of said carriage and said pallet gripping means and for actuating said pallet gripping means, and means for controlling the operating mechanisms arranged to be set into action by the arrival of a pallet at said transfer station and adapted to cause the transfer device in a series of successive operations to grip a pallet while in said first position, to move to said second position and deposit the pallet in a predetermined location on said work holder, to release the pallet and move to said first position, and to actuate said control means to initiate an operating cycle of the machine, and responsive to the conclusion of an operating cycle of the machine for causing said transfer device to move again to said second position and grip the pallet at the conclusion of said operating cycle, to return to said first position and deposit the pallet on said work handling apparatus, and finally to release the pallet to the action of said work handling apparatus.

43. Mechanism for transferring a work carrying pallet from the transfer station of a work handling apparatus to the work holder of an automatic shoe machine having a base member for supporting the work and the pallet, comprising a transfer device including a carriage mounted for movement from a first position adjacent to the transfer station of said work handling apparatus to a second position adjacent to said work holder, pallet gripping means associated with said carriage and mounted for movement relatively thereto to deposit a work carrying pallet on the base member of the work holder when said carriage is in said second position, operating mechanisms for effecting movement of said carriage and said pallet gripping means and for actuating said pallet gripping means, and means for controlling the operating mechanisms arranged to be set into action by the arrival of a pallet at said transfer station and adapted to cause said transfer device in a series of successive operations to grip a pallet while in said first position, to move to said second position and deposit the pallet on said work holder, and to release the pallet and move to said first position, and responsive to the conclusion of a cycle of the automatic machine for controlling the operating mechanism to cause said transfer device to move again to said second position and grip the pallet, to return to said first position and deposit the pallet on said work handling apparatus, and finally to release the pallet to the action of said work handling apparatus.

44. Mechanism for transferring a work carrying pallet from a work handling apparatus to the work holder of an automatic shoe machine having control means for initiating an operating cycle thereof and a base member for supporting the work and the pallet, comprising a transfer device including a carriage mounted for movement from a first position adjacent to said work handling apparatus to a second position adjacent to said work holder, pallet gripping means associated with said carriage and mounted for movement relatively thereto to deposit a work carrying pallet on the base member of the work holder when said carriage is in said second position, operating mechanisms for effecting movement of said carriage and said pallet gripping means and for actuating said pallet gripping means, and means for controlling said operating mechanisms to cause said transfer device in a series of successive operations to grip a pallet while in said first position, to move to said second position and deposit the pallet on said work holder, to release the pallet and move to said first position, and to actuate said control means to initiate an operating cycle of the machine, and responsive to the conclusion of an operating cycle of the machine for controlling said operating mechanisms to cause said transfer device to move again to said second position and grip the pallet at the conclusion of said operating cycle, to return to said first position and deposit the pallet on the work handling apparatus, and finally to release the pallet to the action of said work handling apparatus.

45. Mechanism for transferring a work carrying pallet from the transfer station of a work handling apparatus to the work holder of an automatic shoe machine having control means for initiating an operating cycle thereof and a base member for supporting the work and the pallet, comprising a transfer device including a carriage mounted for movement from a first position adjacent to the transfer station of said work handling apparatus to a second position adjacent to said work holder, pallet gripping means associated with said carriage and mounted for movement relatively thereto to deposit a work carrying pallet on the base member of the work holder when said carriage is in said second position, operating mechanisms for effecting movement of said carriage and said pallet gripping means and for actuating said pallet gripping means, and means for controlling the operating mechanisms arranged to be set into action by the arrival of a pallet at said transfer station and adapted to cause said transfer device in a series of successive operations to grip a pallet while in said first position, to move to said second position and deposit the pallet in a predetermined location on said work holder, to release the pallet and move to said first position, and to actuate said control means to initiate an operating cycle of the machine, and responsive to the conclusion of an operating cycle of the machine for controlling the operating mechanisms to cause said transfer device to move again to said second position and grip the pallet at the conclusion of said operating cycle, to return to said first position and deposit the pallet on said work handling apparatus, and finally to release the pallet to the action of said work handling apparatus.

46. Mechanism for transferring a work carrying pallet from a runway, along which pallets are propelled, to the work holder of an automatic machine, said runway being provided with a gate portion movable between closed and open position, said mechanism comprising a transfer device having means for gripping a pallet and mounted for movement between a first position adjacent to the runway in the vicinity of said gate portion and a second position adjacent to the work holder, and operating mechanism for causing the transfer device in a series of successive operations to grip a pallet while in said first position, to cause the gate portion of the runway to move to open position, to move to said second position and deposit the pallet on said work holder, and to release the pallet and move to said first position, and responsive to the conclusion of a cycle of the automatic machine for causing said transfer device to move again to said second position and grip the pallet, to return to said first position and deposit the pallet on said runway, to cause the gate portion of the runway to move to closed position, and finally to release the pallet for propulsion along said runway.

47. Mechanism for transferring a work carrying pallet from the transfer station of a runway, along which pallets are propelled, to the work holder of an automatic machine, said runway being provided with a gate portion movable between closed and open positions, said mechanism comprising a transfer device having means for gripping a pallet and mounted for movement between a first position adjacent to the runway in the vicinity of said gate portion and a second position adjacent to the work holder, and operating mechanism arranged to be set into action by the arrival of a pallet at said transfer station for causing said transfer device in a series of successive operations to grip a pallet while in said first position, to cause the gate portion of the runway to move to open position, to move to said second position and deposit the pallet on said work holder, and to release the pallet and move to said first position, and responsive to the conclusion of a cycle of the automatic machine for causing said transfer device to move again to said second position and grip the pallet, to return to said first position and deposit the pallet on said runway, and finally to release the pallet for propulsion along said runway.

48. Mechanism for transferring a work carrying pallet from a runway, along which pallets are propelled, to the work holder of an automatic machine having control means for initiating an operating cycle thereof, said runway being provided with a gate portion movable between open and closed positions, said mechanism comprising a transfer device having means for gripping a pallet and mounted for movement between a first position adjacent to the runway in the vicinity of said gate portion and a second position adjacent to the work holder, and operating mechanism for causing said transfer device in a series of successive operations to grip a pallet while in said first position, to cause the gate portion of the runway to move to open position, to move to said second position and deposit the pallet on said work holder, to release the pallet and move to said first position, and to actuate said control means to initiate an operating cycle of the machine, and responsive to the conclusion of an operating cycle of the machine for causing said transfer device to move again to said second position and grip the pallet at the conclusion of said operating cycle, to return to said first position and deposit the pallet on said runway, to cause the gate portion of the runway to move to closed position, and finally to release the pallet for propulsion along said runway.

49. Mechanism for transferring a work carrying pallet from a runway, along which pallets are propelled, to the work holder of an automatic machine having control means for initiating an operating cycle thereof, said runway being provided with a gate portion movable between open and closed positions, said mechanism comprising a transfer device having means for gripping a pallet and mounted for movement between a first position adjacent to the runway in the vicinity of said gate portion and a second position adjacent to the work holder, and operating mechanism for causing said transfer device in a series of successive operations to grip a pallet while in said first position, to cause the gate portion of the runway to move to open position, to move to said second position and deposit the pallet on said work holder, to release the pallet and move to said first position and to actuate said control means to initiate an operating cycle of the machine.

50. Mechanism for transferring a work carrying pallet from a runway, along which pallets are propelled, to the work holder of an automatic machine, said runway being provided with a gate portion movable between closed and open positions, said mechanism comprising a transfer device having means for gripping a pallet and mounted for movement between a first position adjacent to the runway in the vicinity of said gate portion and a second position adjacent to the work holder, and operating mechanism for causing the transfer device in a series of successive operations to grip a pallet while in said first position, to cause the gate portion of the runway to move to open position, to move to said second position and deposit the pallet in a predetermined location on said work holder, and to release the pallet and move to said first position, and responsive to the conclusion of a cycle of the automatic machine for causing said transfer device to move again to said second position and grip the pallet, to return to said first position and deposit the pallet on said runway, to cause the gate portion of the runway to move to closed position, and finally to release the pallet for propulsion along said runway.

51. Mechanism for transferring a work carrying pallet from the transfer station of a runway, along which pallets are propelled, to the work holder of an automatic machine having control means for initiating an operating cycle thereof, said runway being provided with a gate portion movable between closed and open positions, said mechanism comprising a transfer device having means for gripping a pallet and mounted for movement between a first position adjacent to the runway in the vicinity of said gate portion, and a second position adjacent to the work holder, and operating mechanism arranged to be set into action by the arrival of a pallet at said transfer station for causing the transfer device in a series of successive operations to grip a pallet while in said first position, to cause the gate portion of the runway to move to open position, to move to said second position and deposit the pallet in a predetermined location on said work holder, to release the pallet and move to said first position, and to actuate said control means to initiate an operating cycle of the machine, and responsive to the conclusion of an operating cycle of the machine for causing said transfer device, to move again to said second position and grip the pallet at the conclusion of said operating cycle, to return to said first position and deposit the pallet on said runway, to cause the gate portion of the runway to move to closed position, and finally to release the pallet for propulsion along said runway.

52. Mechanism for transferring a work carrying pallet from a runway, along which pallets are propelled, to the work holder of an automatic machine having control means for initiating an operating cycle thereof, said runway being provided with a gate portion movable between open and closed positions, said mechanism comprising a transfer device having means for gripping a pallet and mounted for movement between a first position adjacent to the runway in the vicinity of said gate portion and a second position adjacent to the work holder, and operating mechanism to be set into action by the arrival of a pallet at said transfer station for causing the transfer device in a series of successive operations to grip a pallet while in said first position, to cause the gate portion of the runway to move to open position, to move to said second position and deposit the pallet in a predetermined location on said work holder, to release the pallet and move to said first position, and to actuate said control means to initiate an operating cycle of the machine.

References Cited in the file of this patent
UNITED STATES PATENTS

| | | |
|---|---|---|
| 1,102,310 | Winkley | July 7, 1914 |
| 2,438,896 | Bowen | Apr. 6, 1948 |